(12) United States Patent
Ward et al.

(10) Patent No.: US 10,303,516 B1
(45) Date of Patent: May 28, 2019

(54) ALLOCATING COMPUTING RESOURCES FOR PROVIDING VARIOUS DATASETS TO CLIENT DEVICES

(71) Applicant: SAS Institute Inc., Cary, NC (US)

(72) Inventors: Leigh Anne Ward, Raleigh, NC (US); Caroline Ana Collins, Apex, NC (US); Sherman Bruce Gibbons, Apex, NC (US); Steven Todd Barlow, Raleigh, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 16/173,480

(22) Filed: Oct. 29, 2018

Related U.S. Application Data

(60) Provisional application No. 62/613,123, filed on Jan. 3, 2018, provisional application No. 62/641,898, filed on Mar. 12, 2018.

(51) Int. Cl.
*G06F 9/50* (2006.01)
*H04L 29/06* (2006.01)
*G06F 11/34* (2006.01)

(52) U.S. Cl.
CPC .......... *G06F 9/5038* (2013.01); *G06F 9/5061* (2013.01); *G06F 11/3419* (2013.01); *G06F 11/3452* (2013.01); *H04L 67/42* (2013.01); *G06F 2209/5019* (2013.01)

(58) Field of Classification Search
CPC ............... G06F 9/5038; G06F 11/3419; G06F 11/3452; G06F 9/5061; G06F 2209/5019
See application file for complete search history.

(56) References Cited

U.S. PATENT DOCUMENTS

| 7,774,457 | B1* | 8/2010 | Talwar | G06F 9/5072 |
| | | | | 709/203 |
| 8,392,890 | B2 | 3/2013 | Miller | |
| 8,863,085 | B1 | 10/2014 | Stahlberg | |
| 9,665,288 | B1* | 5/2017 | Aharoni | G06F 3/061 |
| 2008/0059972 | A1* | 3/2008 | Ding | G06F 9/505 |
| | | | | 718/105 |
| 2010/0036641 | A1* | 2/2010 | Lee | G06F 11/3419 |
| | | | | 702/186 |
| 2011/0061057 | A1* | 3/2011 | Harris | G06F 9/5072 |
| | | | | 718/104 |

(Continued)

*Primary Examiner* — Benjamin C Wu
(74) *Attorney, Agent, or Firm* — Kilpatrick Townsend & Stockton LLP

(57) ABSTRACT

One exemplary system can determine datasets to be transmitted to client devices for eliciting performance of a computing-task. The datasets include a first dataset and a second dataset. The system can then generate sets of data-curves for each of the datasets based on test data. The system can also generate a new client-device (NCD) projection based on the test data. The system can generate a new client-device task-completion (NCDTC) projection using (i) the NCD projection, and (ii) a particular set of data-curves for the first dataset. The system can determine a first value based at least in part on the NCDTC projection. The system can also determine a second value via series of steps. The system can determine an impact value by subtracting the second value from the first value. The system may allocate computing resources based on the first value, the second value, or the impact value.

30 Claims, 18 Drawing Sheets

(56) References Cited

U.S. PATENT DOCUMENTS

| | | |
|---|---|---|
| 2013/0086554 A1 | 4/2013 | Huggins |
| 2014/0047342 A1* | 2/2014 | Breternitz ............. G06F 9/5061 |
| | | 715/735 |
| 2014/0089495 A1* | 3/2014 | Akolkar ................ H04L 41/147 |
| | | 709/224 |
| 2014/0282591 A1* | 9/2014 | Stich .................... G06F 9/5061 |
| | | 718/104 |
| 2015/0082097 A1* | 3/2015 | Brewer ............... G06F 11/3409 |
| | | 714/47.1 |

* cited by examiner

| Client Device ID# | P(Day 1) | P(Day 2) | P(Day 3) | P(Day 4) |
|---|---|---|---|---|
| 1 | 0.05 | 0.65 | 0.55 | 0.05 |
| 2 | 0.75 | 0.05 | 0.05 | 0.05 |
| ... | | | | |
| 7867 | 0.05 | 0.05 | 0.05 | 0.05 |
| 7868 | 0.05 | 0.05 | 0.65 | 0.65 |

ALLOCATING COMPUTING RESOURCES FOR PROVIDING VARIOUS DATASETS TO CLIENT DEVICES

REFERENCE TO RELATED APPLICATIONS

This claims the benefit of priority under 35 U.S.C. § 119(e) to U.S. Provisional Patent Application No. 62/613,123, filed Jan. 3, 2018, and to U.S. Provisional Patent Application No. 62/641,898, filed Mar. 12, 2018, the entirety of each of which is hereby incorporated by reference herein.

TECHNICAL FIELD

The present disclosure relates generally to computing resource allocation. More specifically, but not by way of limitation, this disclosure relates to allocating computing resources for providing various datasets to client devices.

BACKGROUND

A server can transmit information that is specifically configured to influence one or more client devices to perform a desired action in response. For example, the server can generate a prompt in order to influence the client device to provide input or perform another computing-task. Often, the server is capable of eliciting the same response from the client device(s) in more than one way. For example, the server may either request an input from the client device(s) via a textual prompt, or may alternatively request the input from the client device(s) via a graphical prompt. And typically each response from a client device requires the server to perform one or more additional computing-tasks, such as storing the received input in a database.

SUMMARY

One example of the present disclosure includes a non-transitory computer-readable medium comprising program code that is executable by a processing device. The program code can cause the processing device to determine a plurality of datasets configured to be transmitted to client devices to elicit performance of a computing-task via the client devices, wherein the plurality of datasets includes a first dataset and a second dataset. The program code can cause the processing device to generate test data indicating how many times the computing-task was performed during a test period, wherein the test data is generated by transmitting both the first dataset and the second dataset to a group of client devices during the test period and logging how many of the client devices in the group perform the computing-task. The program code can cause the processing device to generate a plurality of sets of data-curves for each dataset among the plurality of datasets using the test data, each set of data-curves spanning a future-time-period that is subsequent to the test period and indicating respective likelihoods of a particular dataset resulting in performance of the computing-task during various timespans within the future-time-period. The program code can cause the processing device to generate a new client-device (NCD) projection based on the test data, wherein the NCD projection indicates how many new client-devices will communicate with the processing device during the future-time-period. The program code can cause the processing device to generate a new client-device task-completion (NCDTC) projection using (i) the NCD projection, and (ii) a particular set of data-curves for the first dataset among the plurality of sets of data-curves for the plurality of datasets, wherein the NCDTC projection indicates a total number of new client-devices that will perform the computing-task during the future-time-period, if only the first dataset is provided to the new client-devices during the future-time-period. The program code can cause the processing device to determine a first value based at least in part on the NCDTC projection, the first value representing how many times the computing-task would likely be performed if the client devices are only provided with the first dataset during the future-time-period. The program code can cause the processing device to determine a second value representing how many times the computing-task would be completed if some of the client devices are provided with the first dataset and others of the client devices are provided with the second dataset during the future-time-period. The program code can cause the processing device to determine an impact value by subtracting the second value from the first value, the impact value representing how providing the client devices with only the first dataset during the future-time-period influences performance of the computing-task, as compared to providing the client devices with both the first dataset and the second dataset during the future-time-period. The program code can cause the processing device to allocate computing resources based on the first value, the second value, or the impact value.

Another example of the present disclosure includes a system having a processing device and a memory device comprising program code that is executable by the processing device. The program code can cause the processing device to determine a plurality of datasets configured to be transmitted to client devices to elicit performance of a computing-task via the client devices, wherein the plurality of datasets includes a first dataset and a second dataset. The program code can cause the processing device to generate test data indicating how many times the computing-task was performed during a test period, wherein the test data is generated by transmitting both the first dataset and the second dataset to a group of client devices during the test period and logging how many of the client devices in the group perform the computing-task. The program code can cause the processing device to generate a plurality of sets of data-curves for each dataset among the plurality of datasets using the test data, each set of data-curves spanning a future-time-period that is subsequent to the test period and indicating respective likelihoods of a particular dataset resulting in performance of the computing-task during various timespans within the future-time-period. The program code can cause the processing device to generate a new client-device (NCD) projection based on the test data, wherein the NCD projection indicates how many new client-devices will communicate with the processing device during the future-time-period. The program code can cause the processing device to generate a new client-device task-completion (NCDTC) projection using (i) the NCD projection, and (ii) a particular set of data-curves for the first dataset among the plurality of sets of data-curves for the plurality of datasets, wherein the NCDTC projection indicates a total number of new client-devices that will perform the computing-task during the future-time-period, if only the first dataset is provided to the new client-devices during the future-time-period. The program code can cause the processing device to determine a first value based at least in part on the NCDTC projection, the first value representing how many times the computing-task would likely be performed if the client devices are only provided with the first dataset during the future-time-period. The program code can cause the processing device to determine a second value representing how many times the computing-task would be completed if some of the client devices are provided with the first dataset and others of the client devices are provided with the second dataset during the future-time-period. The program code can cause the processing device to determine an impact value by subtracting the second value from the first value, the impact value representing how providing the client devices with only the first dataset during the future-time-period influences performance of the computing-task, as compared to providing the client devices with both the first dataset and the second dataset during the future-time-period. The program code can cause the processing device to allocate computing resources based on the first value, the second value, or the impact value.

Still another example of the present disclosure includes a method including determining a plurality of datasets configured to be transmitted to client devices to elicit performance of a computing-task via the client devices, wherein the plurality of datasets includes a first dataset and a second dataset. The method can include generating test data indicating how many times the computing-task was performed during a test period, wherein the test data is generated by transmitting both the first dataset and the second dataset to a group of client devices during the test period and logging how many of the client devices in the group perform the computing-task. The method can include generating a plurality of sets of data-curves for each dataset among the plurality of datasets using the test data, each set of data-curves spanning a future-time-period that is subsequent to the test period and indicating respective likelihoods of a particular dataset resulting in performance of the computing-task during various timespans within the future-time-period. The method can include generating a new client-device (NCD) projection based on the test data, wherein the NCD projection indicates how many new client-devices will communicate with the processing device during the future-time-period. The method can include generating a new client-device task-completion (NCDTC) projection using (i) the NCD projection, and (ii) a particular set of data-curves for the first dataset among the plurality of sets of data-curves for the plurality of datasets, wherein the NCDTC projection indicates a total number of new client-devices that will perform the computing-task during the future-time-period, if only the first dataset is provided to the new client-devices during the future-time-period. The method can include determining a first value based at least in part on the NCDTC projection, the first value representing how many times the computing-task would likely be performed if the client devices are only provided with the first dataset during the future-time-period. The method can include determining a second value representing how many times the computing-task would be completed if some of the client devices are provided with the first dataset and others of the client devices are provided with the second dataset during the future-time-period. The method can include determining an impact value by subtracting the second value from the first value, the impact value representing how providing the client devices with only the first dataset during the future-time-period influences performance of the computing-task, as compared to providing the client devices with both the first dataset and the second dataset during the future-time-period. The method can include allocating computing resources based on the first value, the second value, or the impact value. Some or all of these steps can be implemented by a processing device.

Yet another example of the present disclosure can include a non-transitory computer-readable medium comprising program code that is executable by a processing device. The program code can cause the processing device to determine a plurality of datasets configured to be transmitted to users to elicit performance of a task, wherein the plurality of datasets includes a first dataset and a second dataset. The program code can cause the processing device to generate test data indicating how many times the task was performed during a test period, wherein the test data is generated by transmitting both the first dataset and the second dataset to a group of users during the test period and logging how many of the users in the group perform the task. The program code can cause the processing device to generate a plurality of sets of data-curves for each dataset among the plurality of datasets using the test data, each set of data-curves spanning a future-time-period that is subsequent to the test period and indicating respective likelihoods of a particular dataset resulting in performance of the task during various timespans within the future-time-period. The program code can cause the processing device to generate a new user (NU) projection based on the test data, wherein the NU projection indicates how many new users will communicate with the processing device during the future-time-period. The program code can cause the processing device to generate a new user task-completion (NUTC) projection using (i) the NU projection, and (ii) a particular set of data-curves for the first dataset among the plurality of sets of data-curves for the plurality of datasets, wherein the NUTC projection indicates a total number of new users that will perform the task during the future-time-period, if only the first dataset is provided to the new users during the future-time-period. The program code can cause the processing device to determine a first value based at least in part on the NUTC projection, the first value representing how many times the task would likely be performed if the users are only provided with the first dataset during the future-time-period. The program code can cause the processing device to determine a second value representing how many times the task would be completed if some of the users are provided with the first dataset and others of the users are provided with the second dataset during the future-time-period. The program code can cause the processing device to determine an impact value by subtracting the second value from the first value, the impact value representing how providing the users with only the first dataset during the future-time-period influences performance of the task, as compared to providing the users with both the first dataset and the second dataset during the future-time-period. Other examples of the present disclosure can include a system and method for implementing the operations discussed above.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 15 is a table of an example of probabilities of client devices returning each day during a future-time-period according to some aspects.

Figure 1:
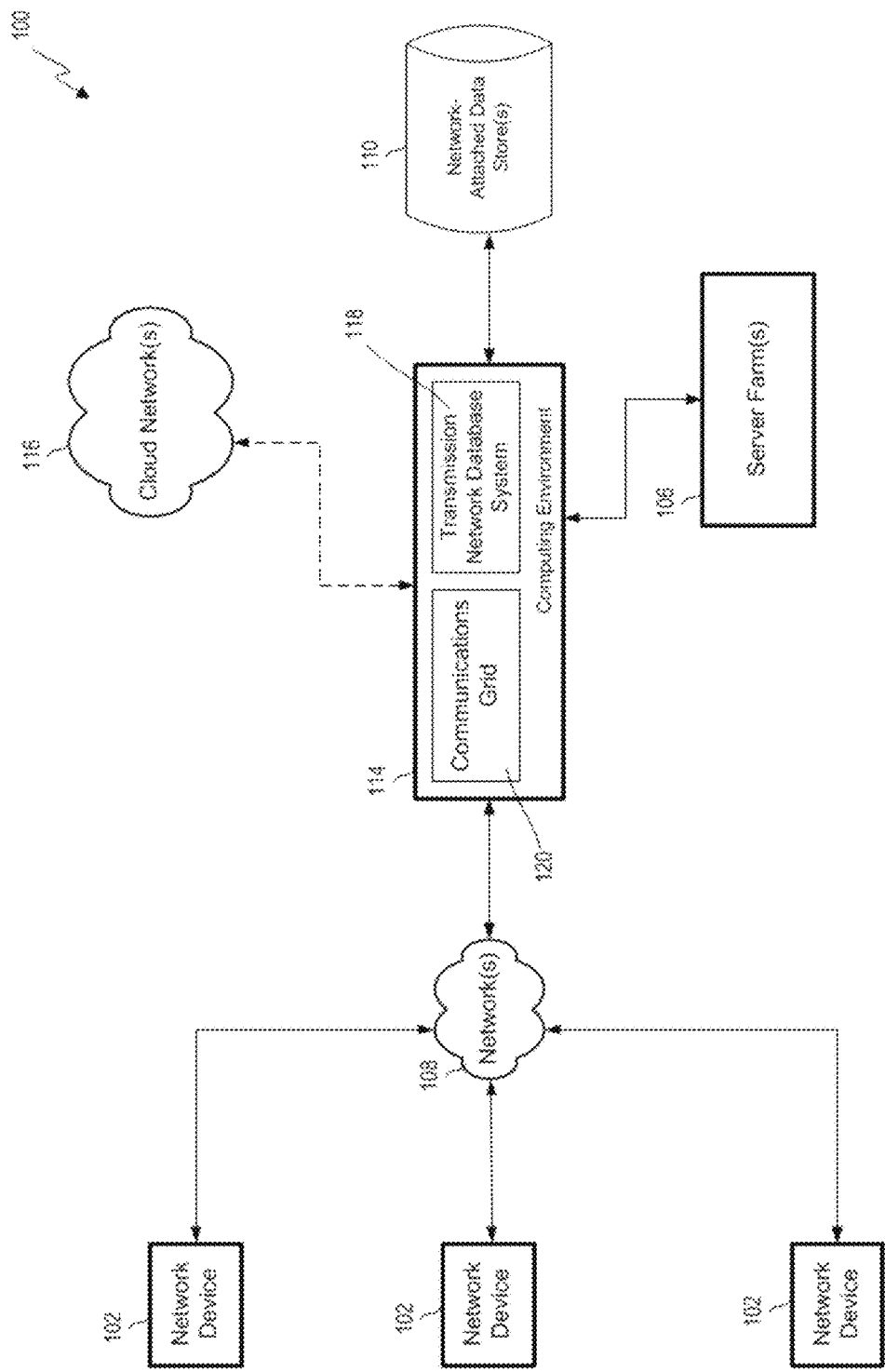
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A server can attempt to elicit a desired response from client devices using multiple different approaches. And each of these approaches may result in different amounts of client devices actually responding in the desired manner. For example, one approach may elicit the desired response from the client devices more often than another approach. As a result, it is difficult for a server to predict how many responses it is actually going to get from the client devices when the server is simultaneously using more than one of these approaches. And if the server cannot predict how many responses it is going to get, the server cannot preemptively allocate computing resources (e.g., a network resource, data-storage resource, processing resource, or memory resource) to handle those responses. Instead, the server must attempt to garner the computing resources on-the-fly as the responses come in, at which point the computing resources required to handle the responses may be unavailable—e.g., because they are already devoted to performing other computing tasks. This can lead to a variety of technical problems, such as increased latency, memory errors, and processing errors.

Some examples of the present disclosure can overcome one or more of the abovementioned problems by providing a server capable of accurately predicting how many times a certain dataset (or combination of data transmissions) will elicit a desired response from client devices. The server may then preemptively allocate computing resources based on the prediction. For example, the server can automatically allocate its computing resources such that the server has sufficient resources available to handle the responses as they arrive. This can reduce latency, memory errors, and processing errors, and provide other improvements to system operation. The server can also output the prediction to one or more users, e.g., to enable a user to take any desired preventative or preemptive action to improve system performance.

As a particular example, a server may have a first dataset and a second dataset that it can transmit to client devices in order to elicit a desired response, such as a button click in a graphical user interface. The server can transmit both datasets to various client devices for a test period (e.g., one week) and log how many of the client devices respond to each of the datasets in the desired manner during the test period. The server can then use the log to generate one or more predictions. For example, the server can predict a first value of how many of the client devices will likely respond in the desired manner during the future-time-period, if the new client devices are only provided with the first dataset during the future-time-period. One example of the first value can be 560. The server can also predict a second value of how many of the client devices will likely respond in the desired manner during the future-time-period, if some of the client devices are provided with the first dataset and others of the client devices are provided with the second dataset during the future-time-period. One example of the second value can be 320.

After predicting the first value and the second value, the server can use these values to determine an impact value. The impact value can represent how providing the client devices with only the first dataset during the future-time-period influences the number of times in which the server receives the desired response, as compared to providing some client devices with the first dataset and other client devices with the second dataset. The server can determine the impact value by subtracting the second value from the first value, e.g., 560−320=240.

In some examples, the server can use the impact value to determine the most effective way in which to allocate computing resources in order to elicit a desired response from the client devices. For example, if the impact value is positive, it may suggest that the most efficient way in which to allocate computing resources in order elicit a desired response from the client devices is to only transmit the first dataset during the future-time-period. So the server can configure itself (or another server) to only transmit the first dataset during the future-time-period. In contrast, if the impact value is negative, it may suggest that the most efficient way in which to allocate computing resources in order to elicit the desired response from the client devices is to transmit both of the first dataset and the second dataset during the future-time-period. So the server can configure itself (or another server) to transmit both of the datasets during the future-time-period. Either way, the server can implement the approach that elicits the desired response the most times from the client devices while consuming the least amount of computing resources.

The server may additionally or alternatively allocate computing resources based on the first value, the second value, or both. For example, the server can use the impact value to determine that it should only transmit the first dataset during the future-time-period in order to elicit a desired response the most times. The server can then use the first value corresponding to the first dataset as an estimate of how many times the client devices will likely respond in the desired manner during the future-time-period, if the server only provides the first dataset during the future-time-period. Finally, the server can preemptively allocate sufficient computing-resources to be able to handle that many (e.g., 560) responses from the client devices.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for implementing some aspects of the present disclosure. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in managing computing resources in accordance with some aspects, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for predicting impacts of providing various datasets to client devices to a network-attached data store 110 for storage. The computing environment 114 may later retrieve the data from the network-attached data store 110 and use the data to predict impacts of providing various datasets to client devices.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for predicting impacts of providing various datasets to client devices.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for predicting impacts of providing various datasets to client devices. For example, the computing environment 114, a network device 102, or both can implement one or more versions of the processes discussed with respect to any of the figures.

Figure 2:
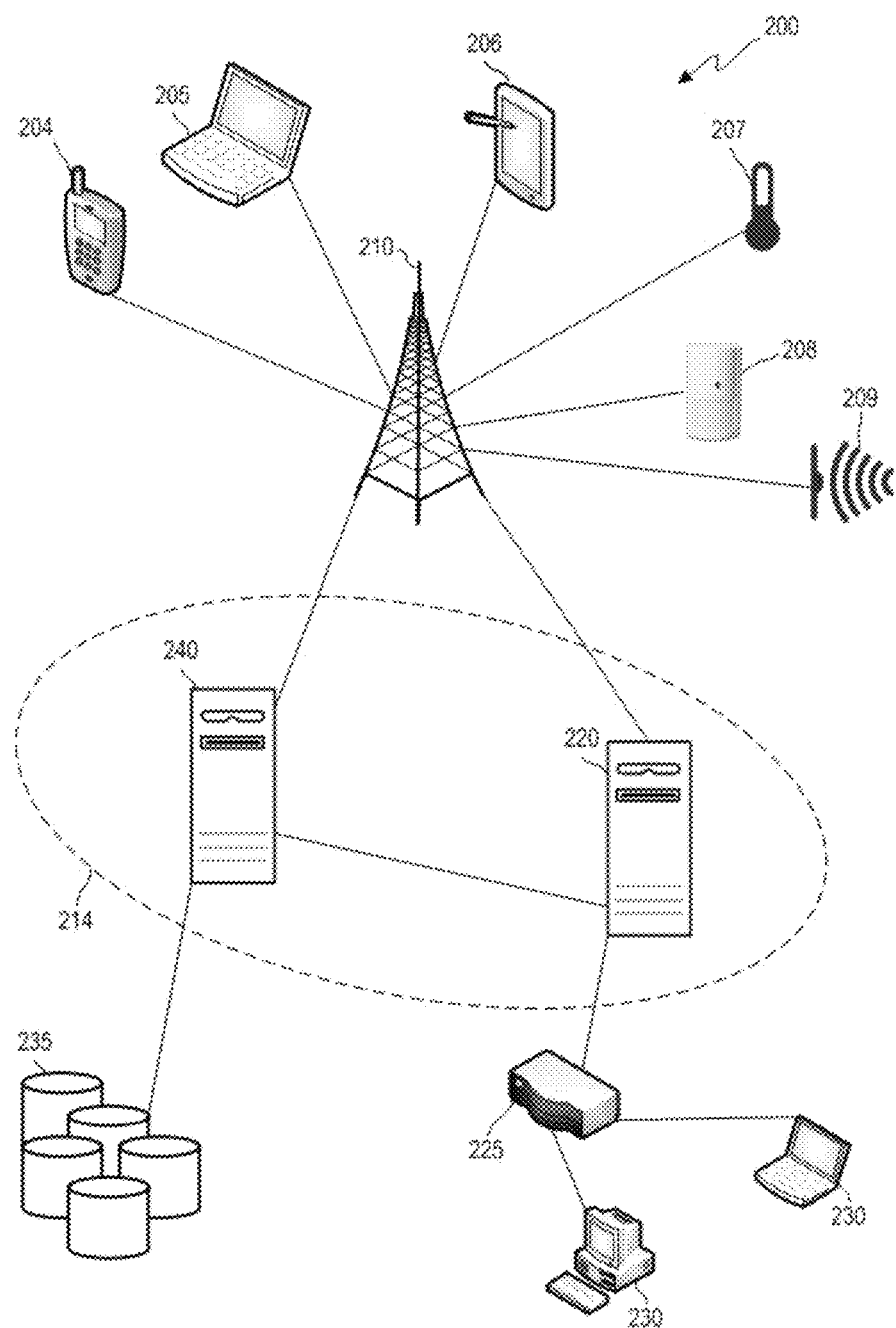
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to predict impacts of providing various datasets to client devices).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for predicting impacts of providing various datasets to client devices using a set of data, the computing environment 214 can perform a pre-analysis of the data. The pre-analysis can include determining whether the data is in a correct format and, if not, reformatting the data into the correct format.

Figure 3:
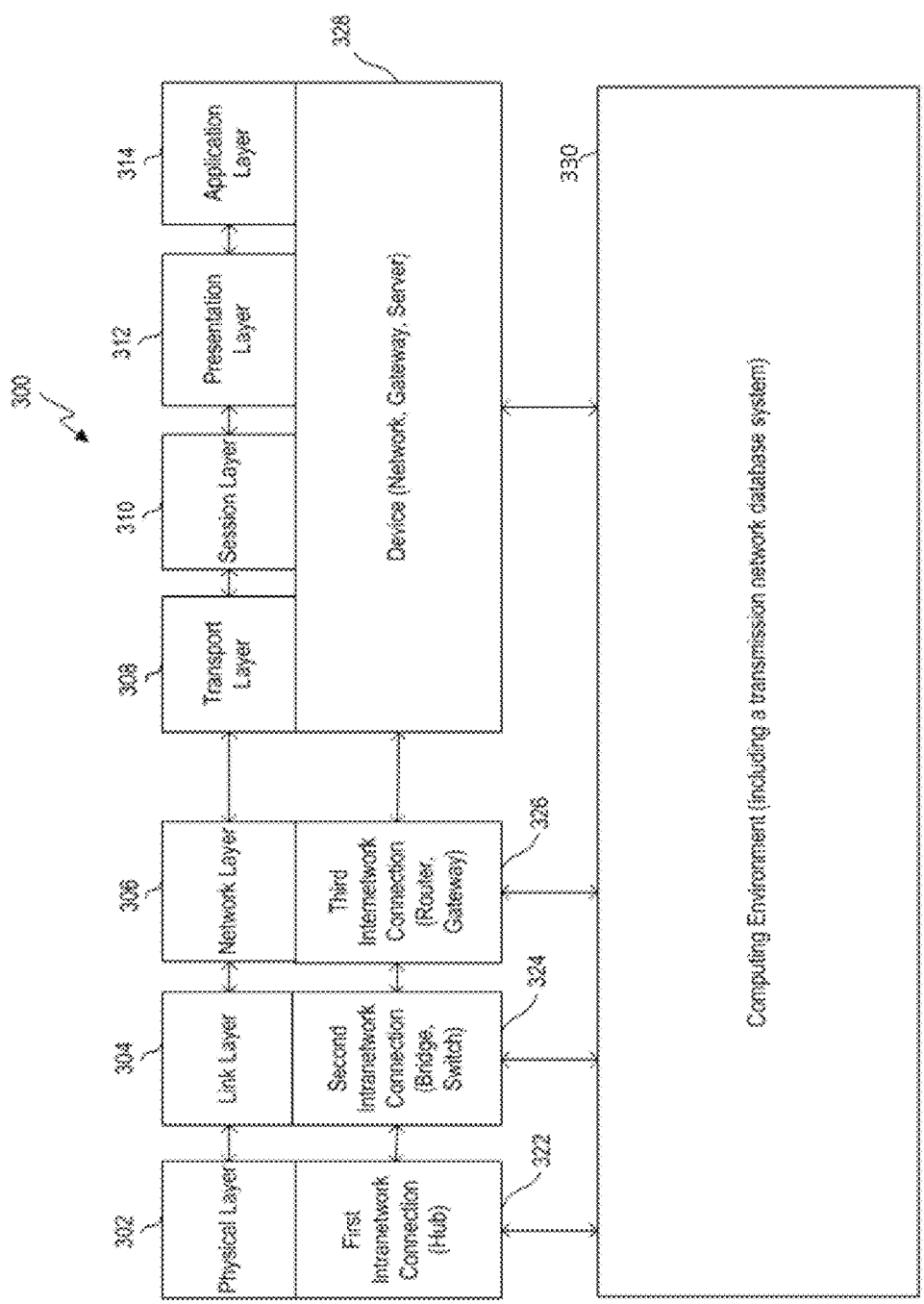
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for predicting impacts of providing various datasets to client devices, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for predicting impacts of providing various datasets to client devices.

Figure 4:
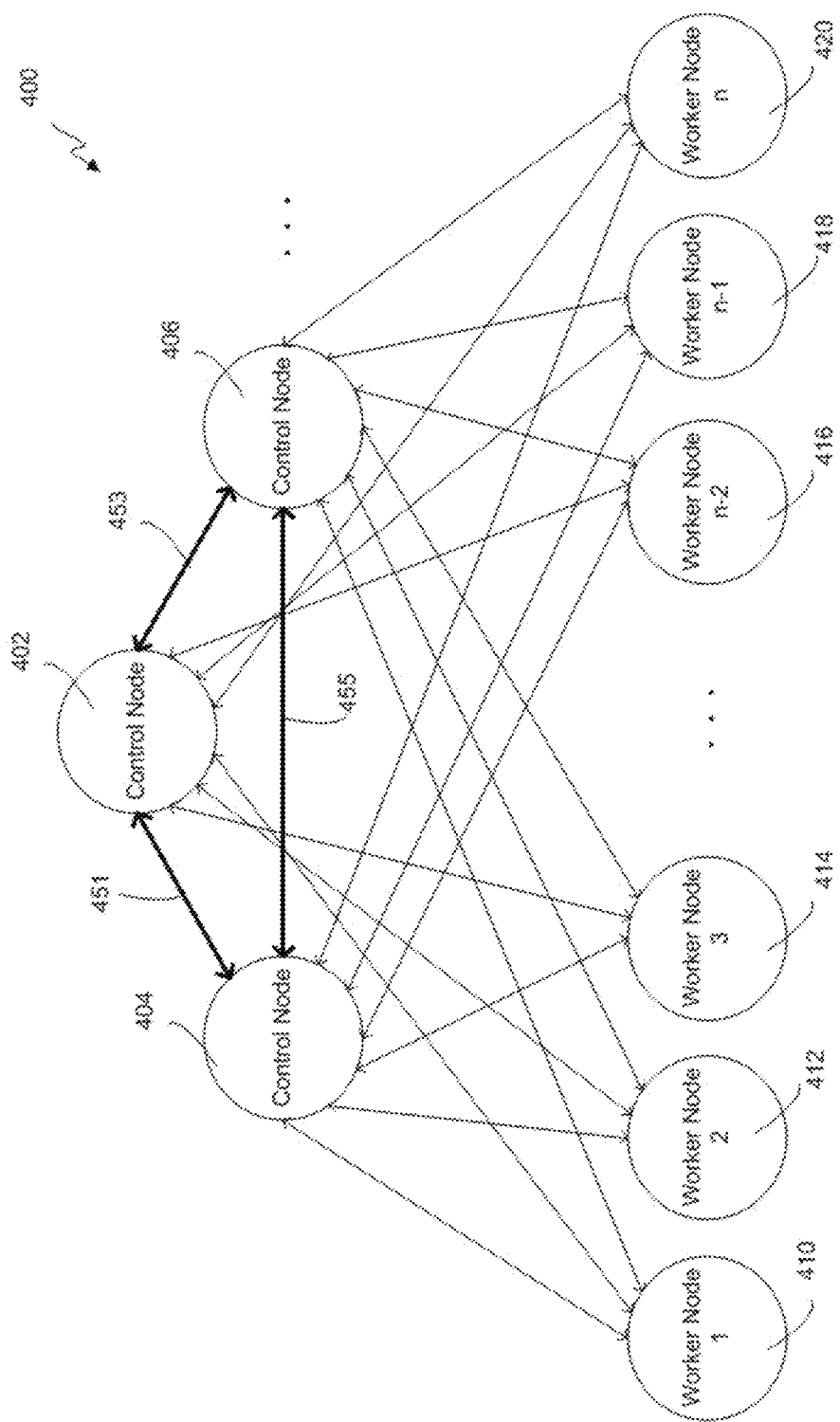
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to predicting impacts of providing various datasets to client devices. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for predicting impacts of providing various datasets to client devices can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may perform operations using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to implement various functionality described herein.

Figure 5:
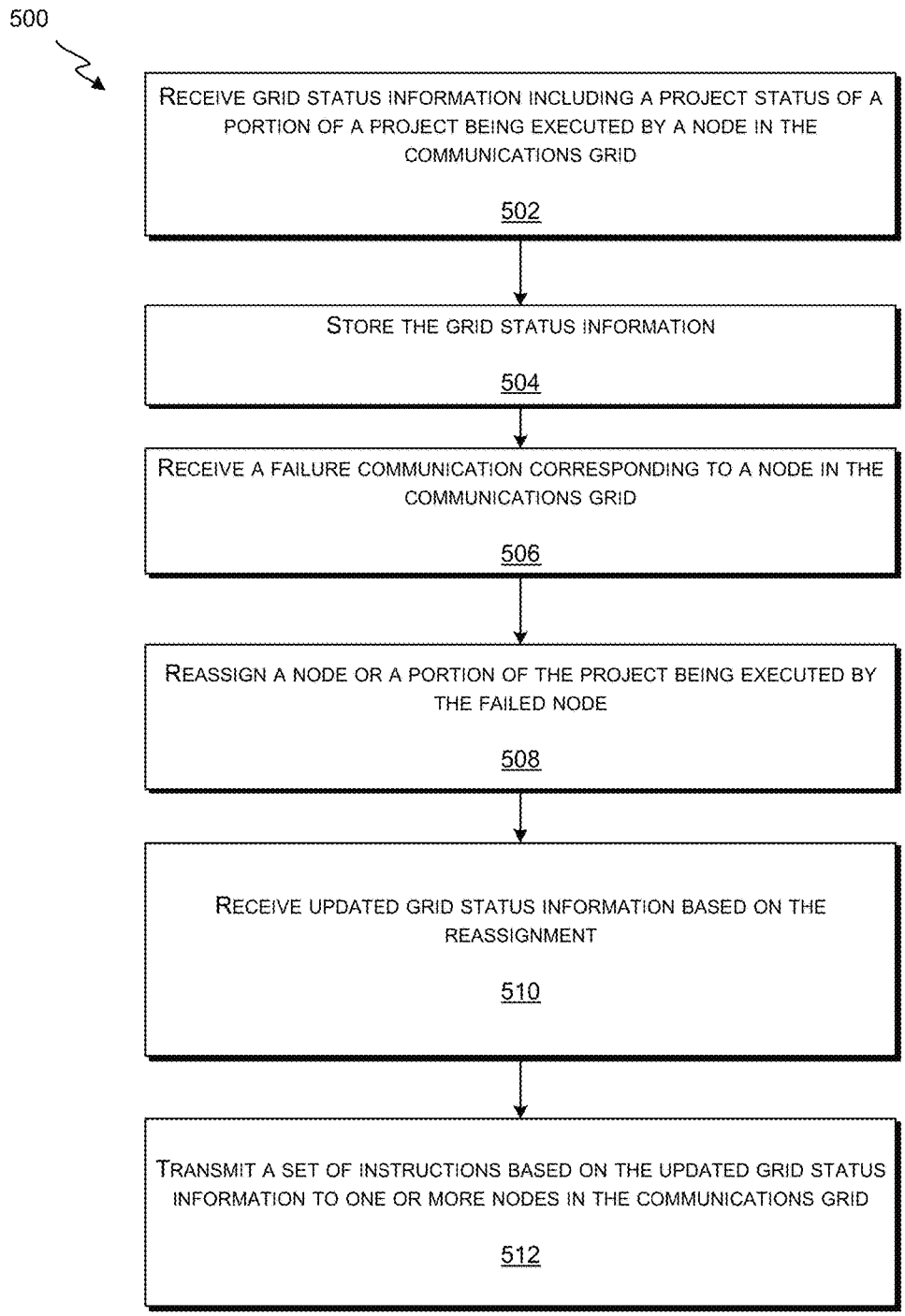
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
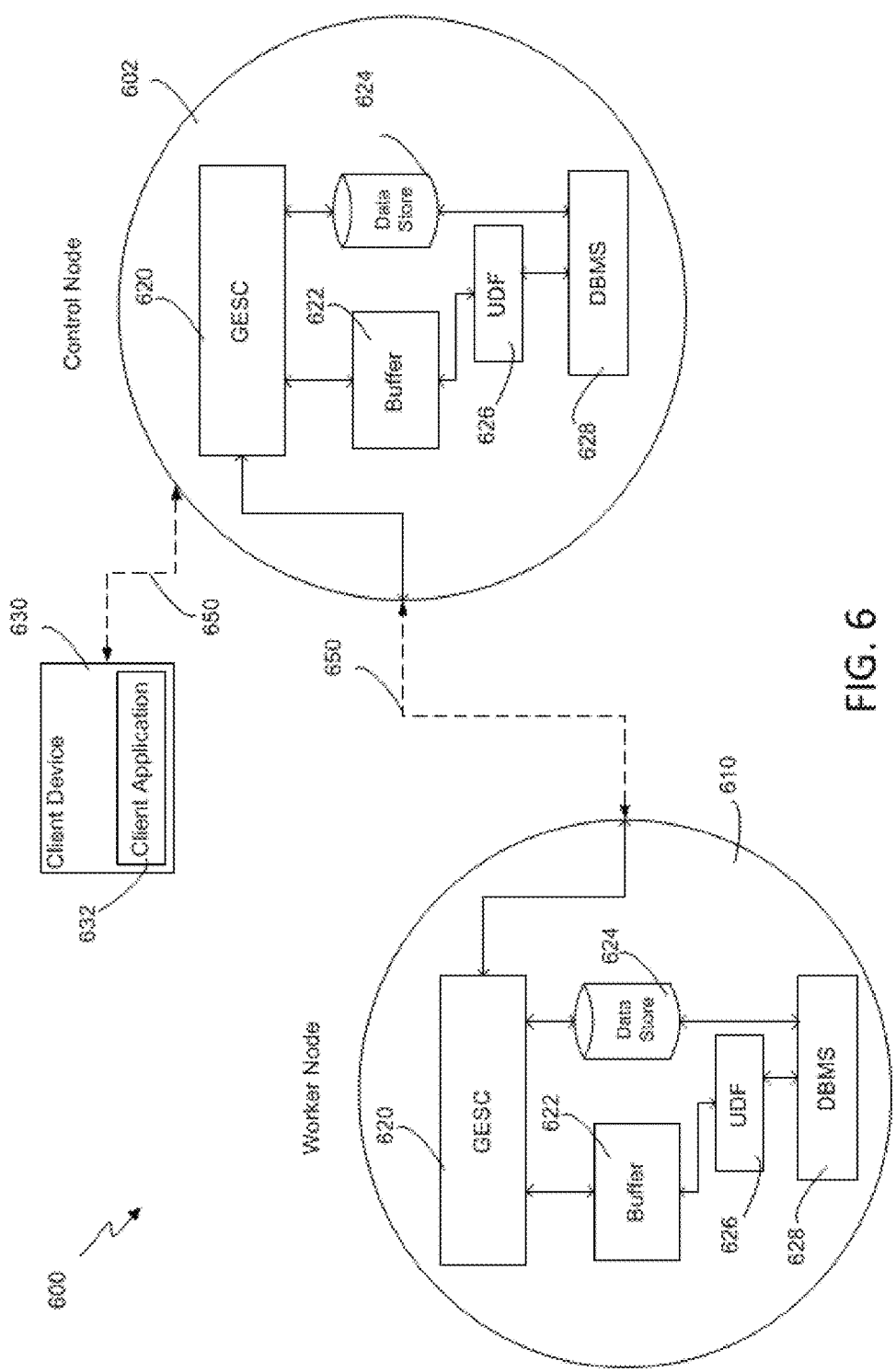
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
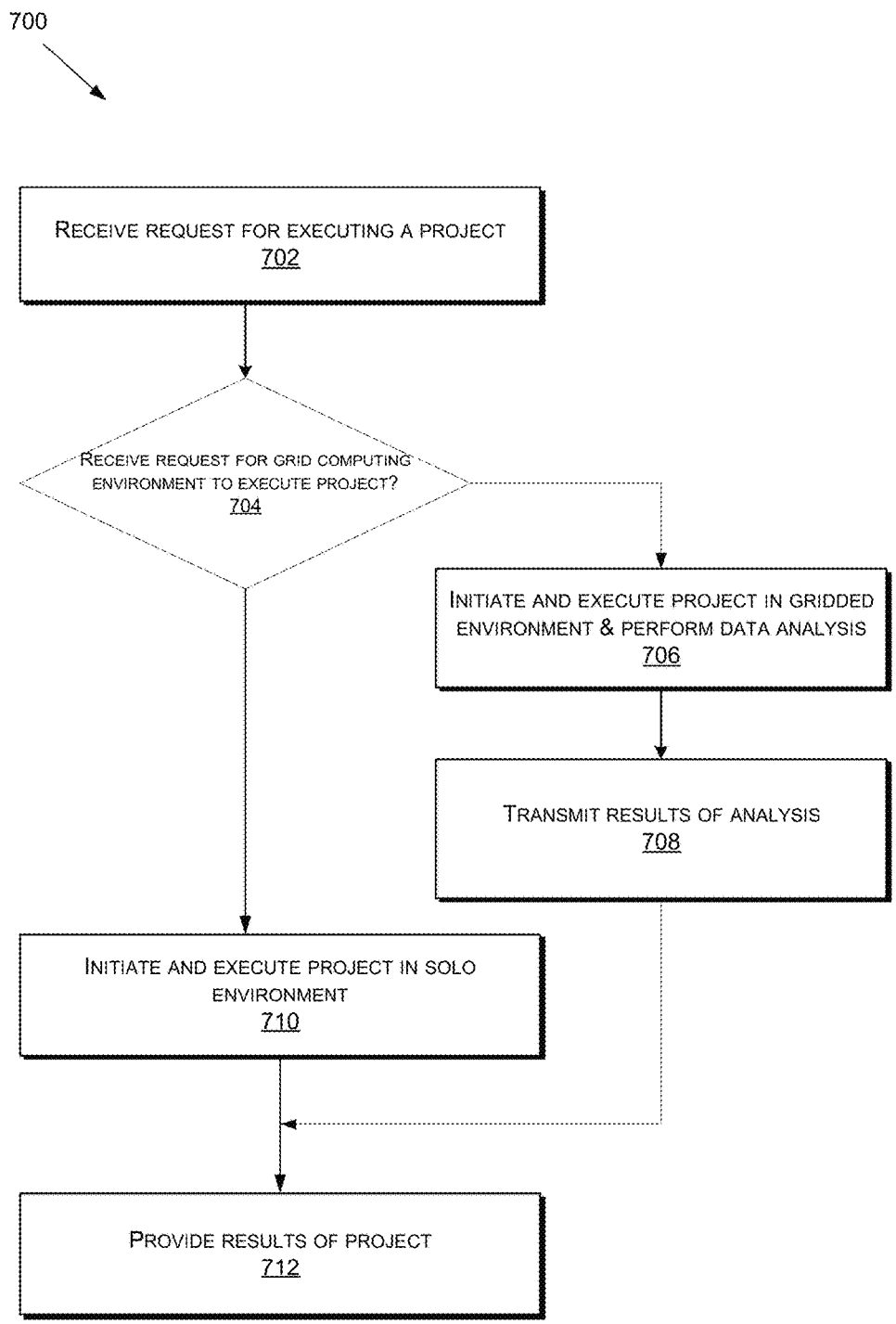
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
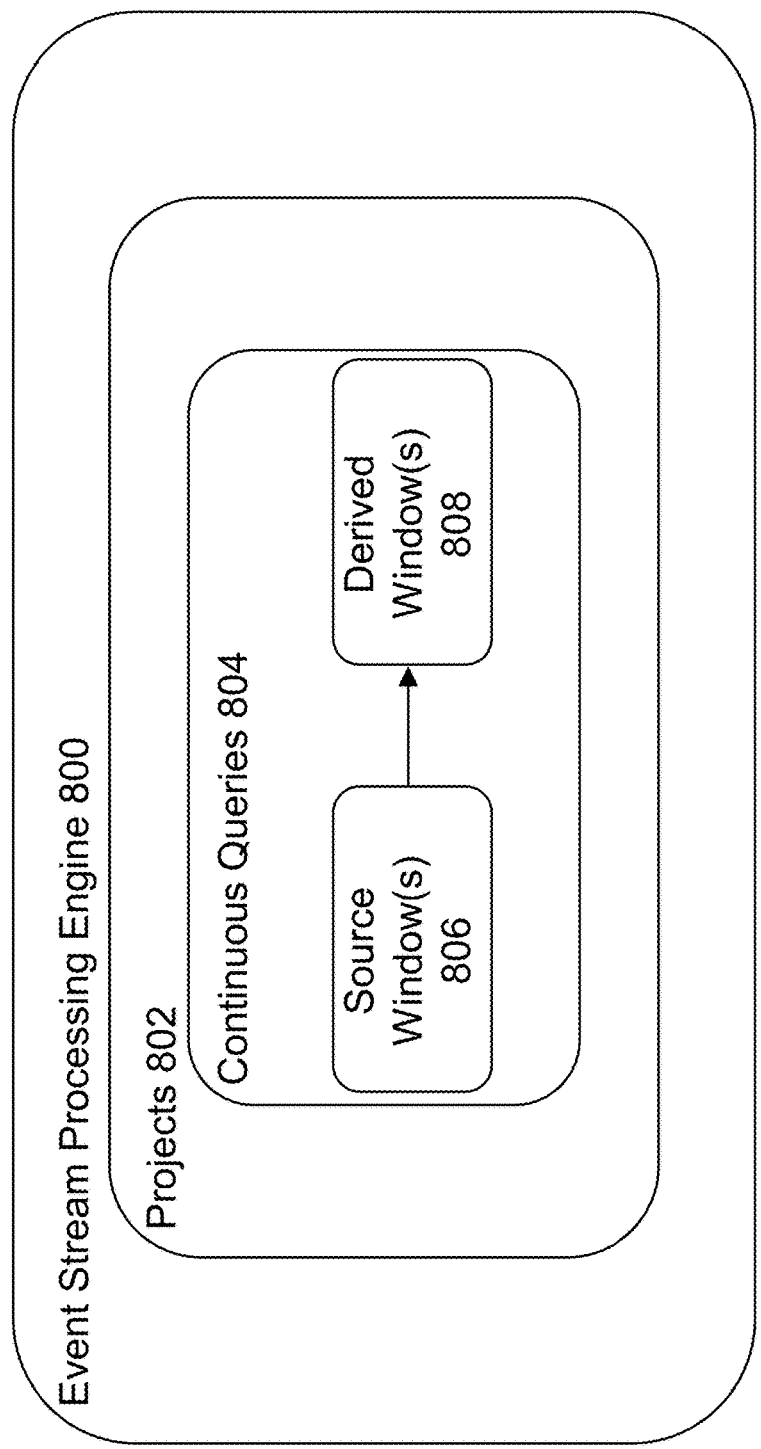
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
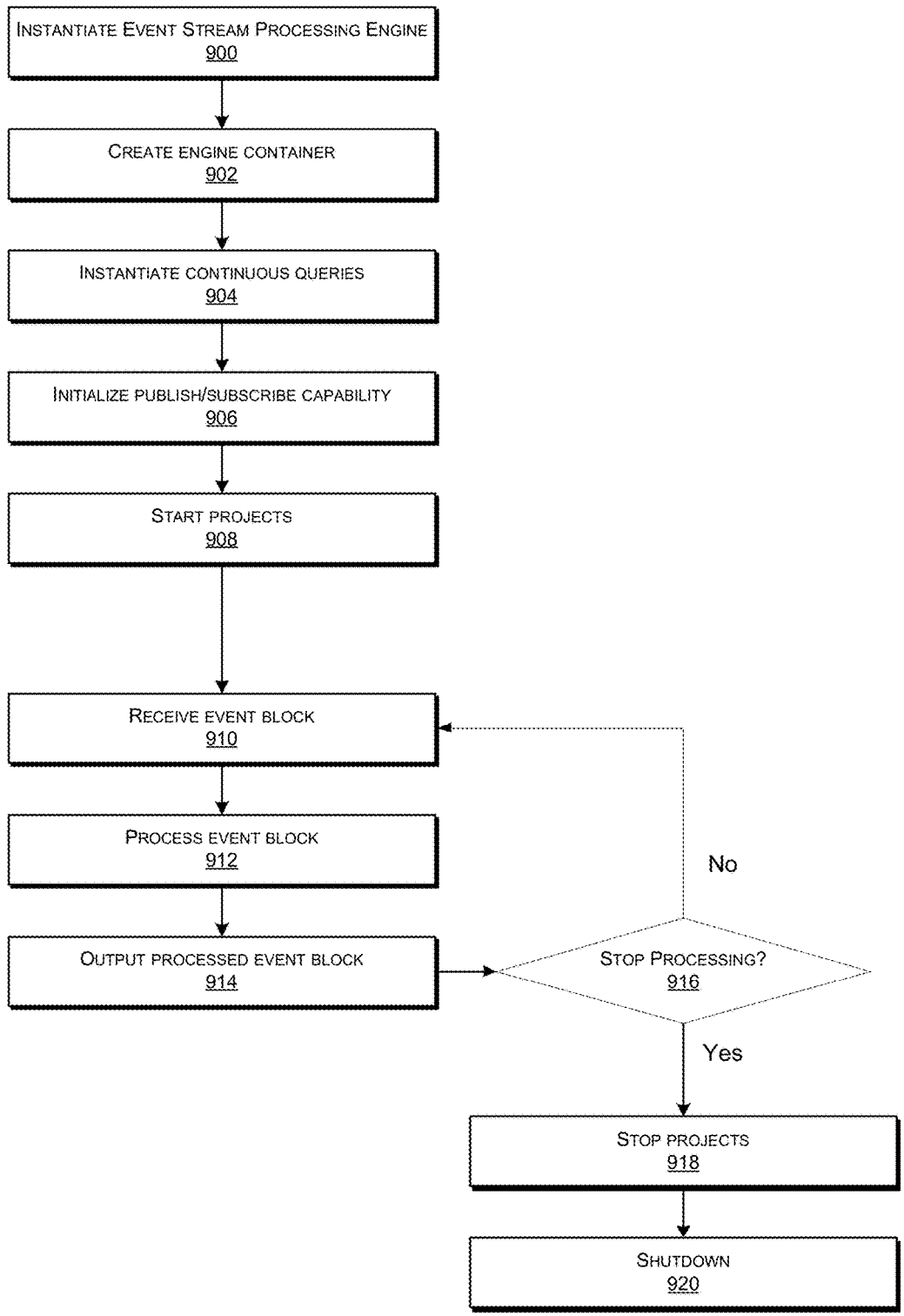
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
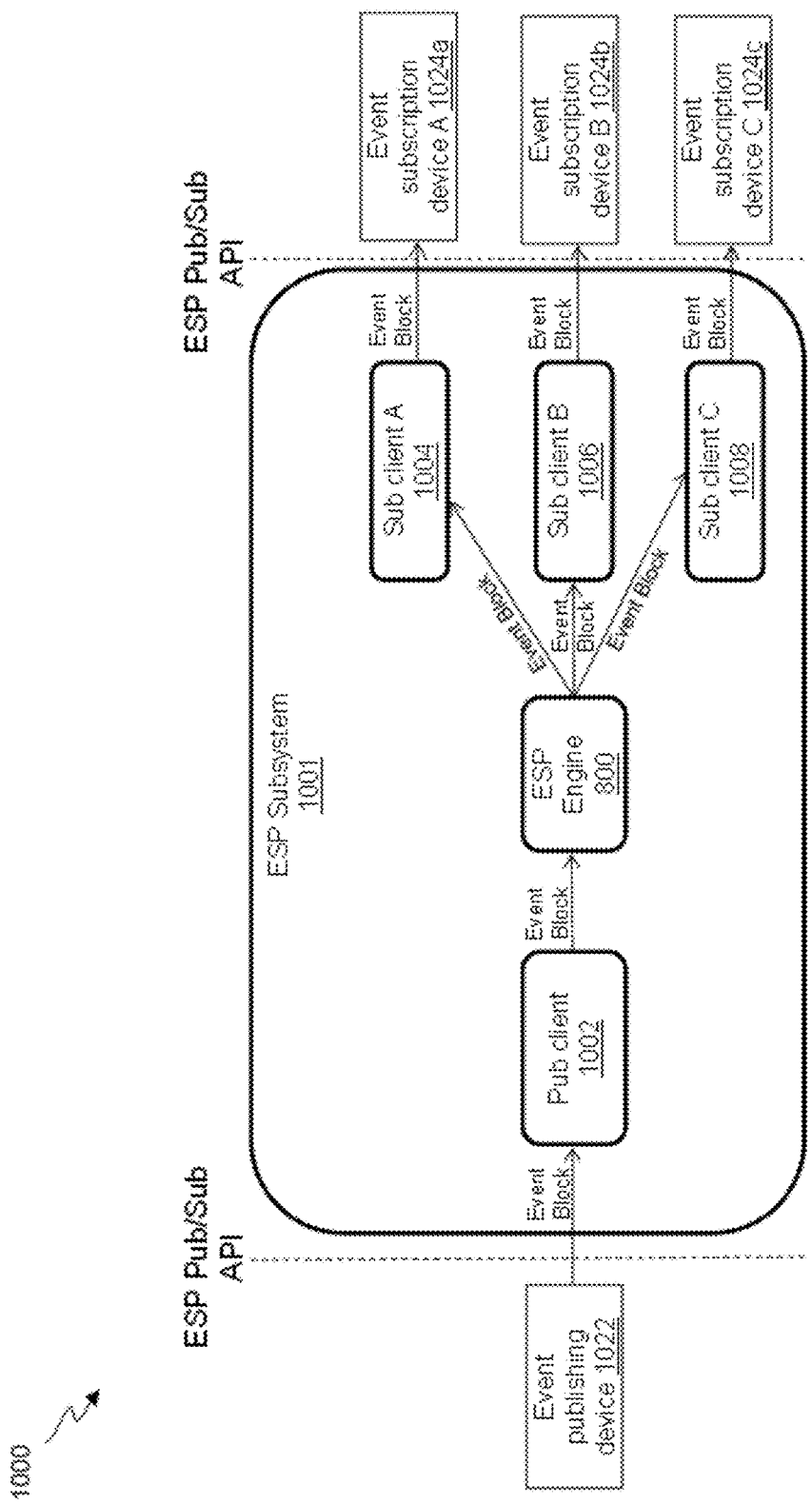
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
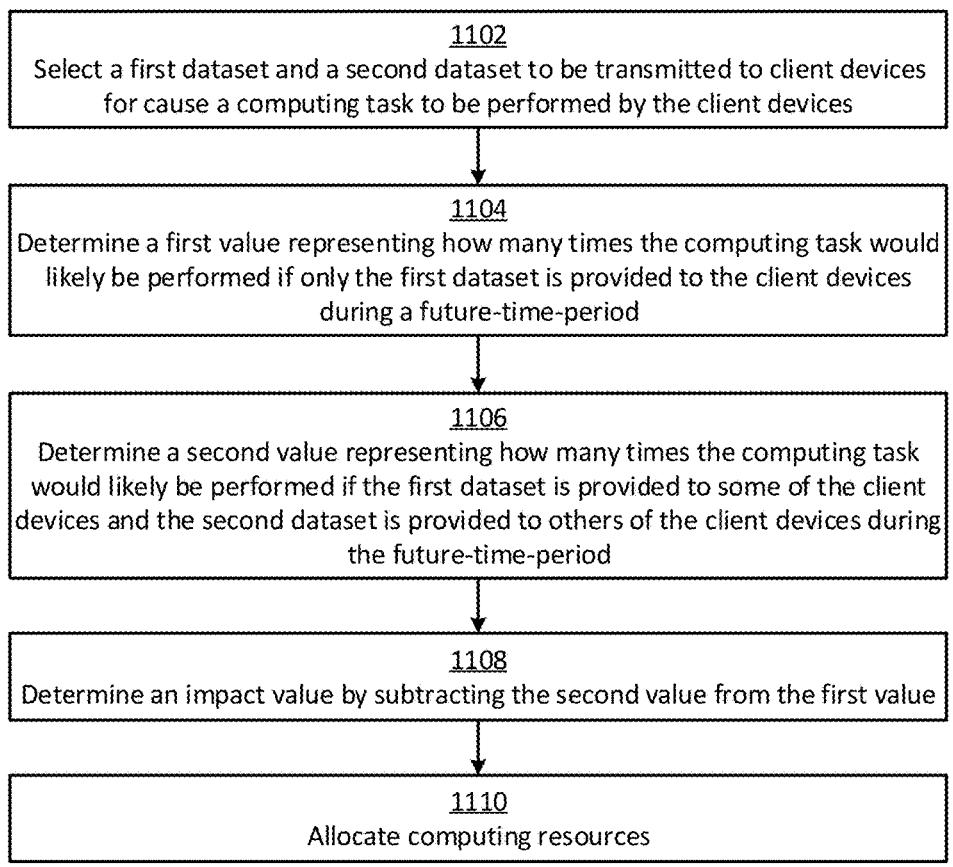
FIG. 11 is a flow chart of an example of a process for allocating computing resources according to some aspects.

FIG. 11 is a flow chart of an example of a process for allocating computing resources according to some aspects. Some examples can include more operations than, fewer operations than, different operations than, or a different order of the operations shown in FIG. 11. Some examples can be implemented using any of the systems and processes described with respect to FIGS. 1-10.

In block 1102, a processing device (e.g., of a server) selects a first dataset and a second dataset to be provided to one or more client devices for causing a computing task to be performed on the client devices. The first dataset and the second dataset can have different information from one another but can both be configured to cause the same computing task to be performed on the client devices. For example, the first dataset and the second dataset can each be configured to influence users of the client devices to select, press, move, or otherwise manipulate a graphical user interface (GUI) component output by the client devices. Examples of the GUI component can include a button, text box, check box, banner, or frame.

The processing device can select the first dataset and the second dataset in response to determining that the first dataset and the second dataset both configured to cause the same computing task to be performed on the client devices. In some examples, the processing device makes this determination based on user input. For example, a user can select the first dataset and the second dataset as being alternatives to one another and capable of eliciting the same response from users of the client devices.

In block 1104, the processing device determines a first value representing how many times the computing task would likely be performed if only the first dataset is provided to the client devices during a future-time-period (e.g., as opposed to both of the first dataset and the second dataset being provided to the client devices during the future-time-period). This may involve performing some or all of the operations shown in FIG. 12. Other examples can involve more operations than, fewer operations than, different operations than, or a different order of the operations shown in FIG. 12.

Figure 12:
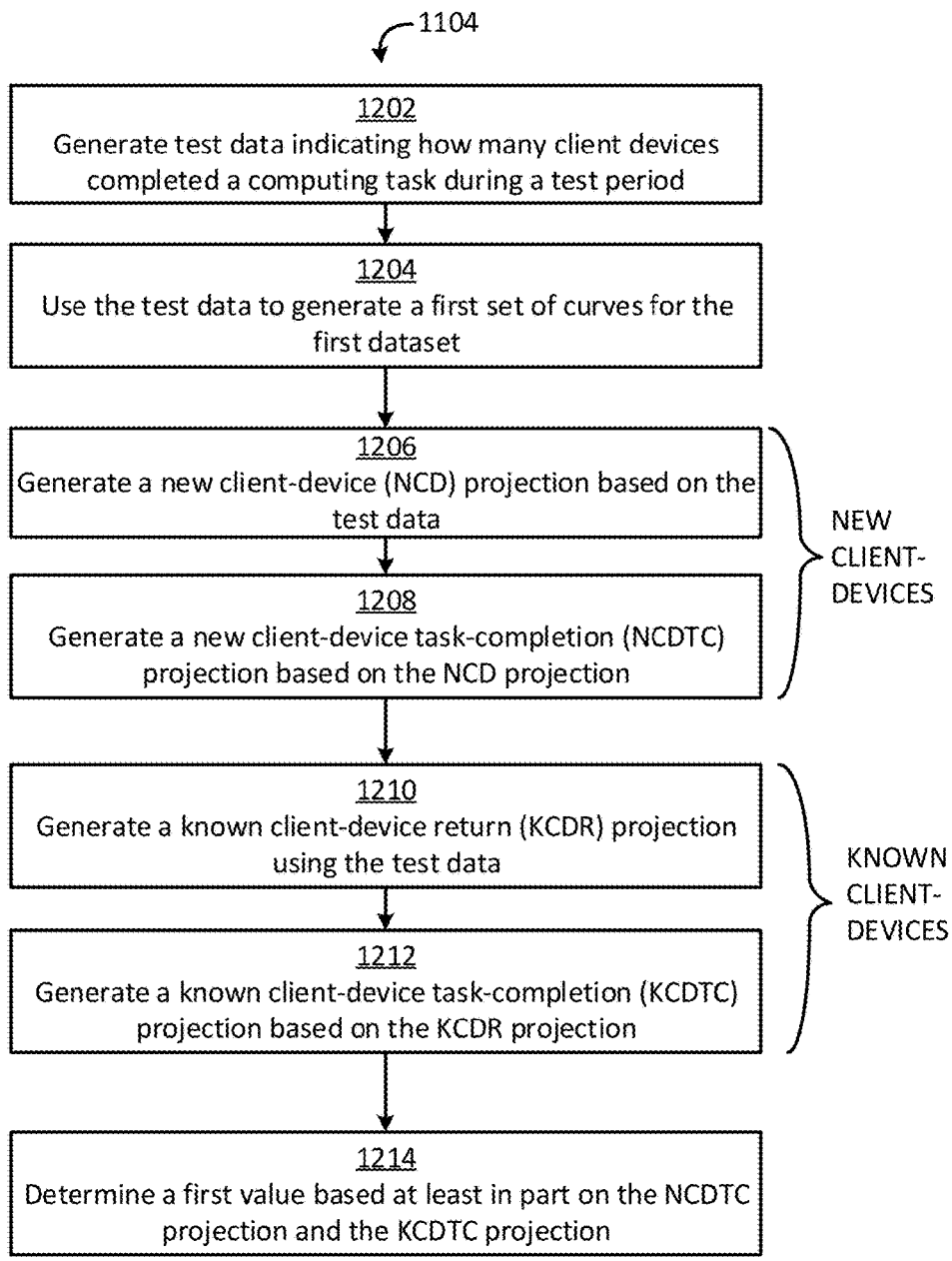
FIG. 12 is a flow chart of an example of a process for determining a first value according to some aspects.

Now referring to FIG. 12, in block 1202, the processing devices generates test data indicating how many client devices performed the computing task during a test period. This can involve transmitting the first dataset and the second dataset to the client devices during the test period (e.g., a four day timespan) and logging how many of the client devices respond by completing the computing task. The resulting log can serve as the test data.

In block 1204, the processing device uses the test data to generate first set of curves for the first dataset. In some examples, the processing device can generate the first set of curves using survival analysis, which generally involves predicting the expected duration of time until a particular event occurs.

Figure 13:
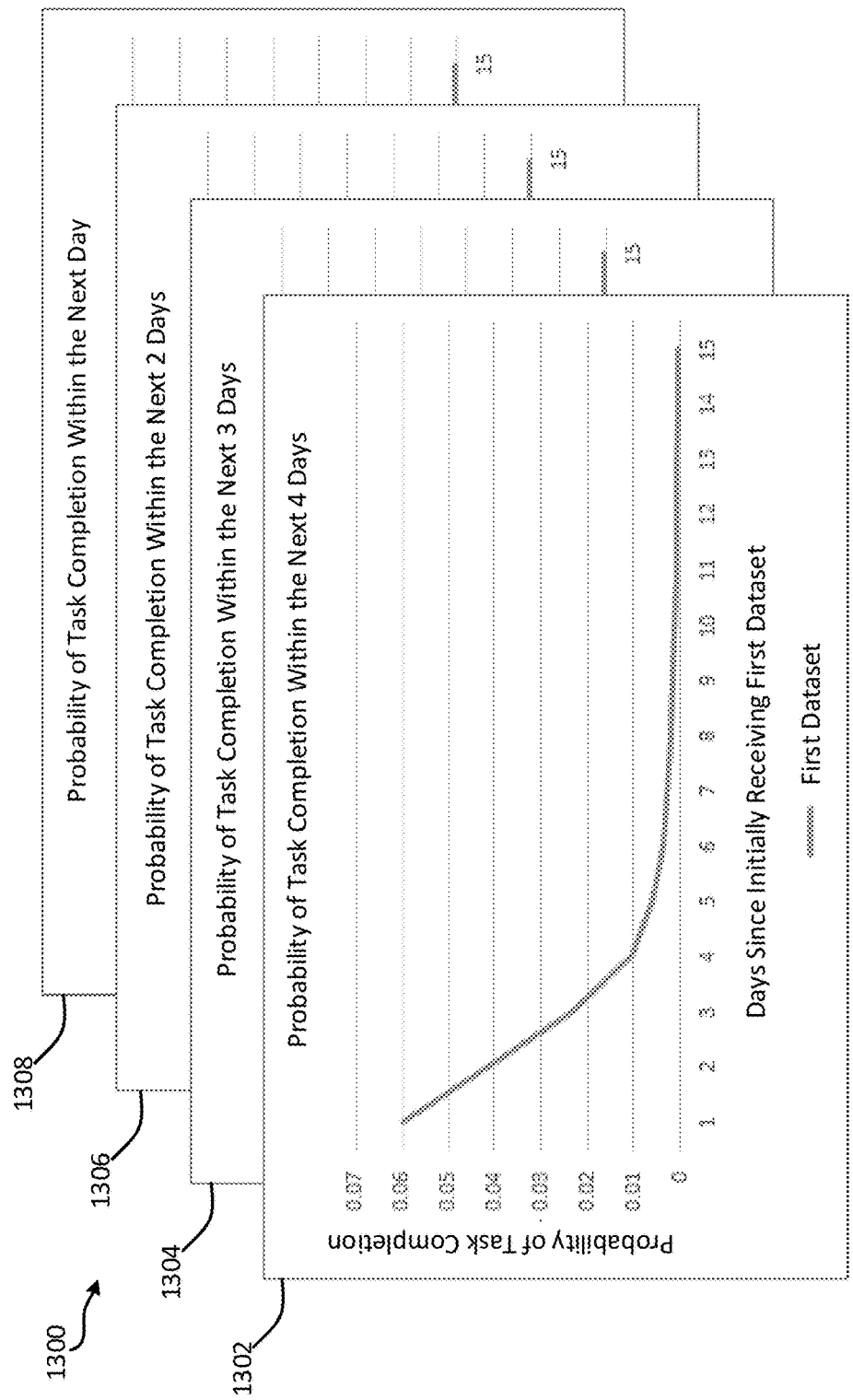
FIG. 13 depicts graphs representing examples of curves according to some aspects.

One example of the first set of curves for the first dataset is shown in FIG. 13. In this example, the first set of curves 1300 includes four curves because the test period is four days long. Each curve corresponds to a particular day in the test period and represents a probability of the computing task being performed at some point during the duration of the test period, if the first dataset is transmitted to the client devices for the first time on that particular day. For example, graph 1302 corresponds to the first day in the four-day test period and represents the probability of the computing task being performed at some point during the duration of the test period if the first dataset is transmitted to the client devices on the first day. Graph 1304 corresponds to the second day in the four-day test period and represents the probability of the computing task being performed at some point during the duration of the test period if the first dataset is transmitted to the client devices on the second day. Graph 1303 corresponds to the third day in the four-day test period and represents the probability of the computing task being performed at some point during the duration of the test period if the first dataset is transmitted to the client devices on the third day. And so on.

Referring back to FIG. 12, in block 1206, the processing device generates a new client-device (NCD) projection. A new client-device projection indicates how many new client-devices will arrive (e.g., communicate with the processing device) on each day during a future-time-period. A new client-device is a client device that did not previously receive one of the two datasets from the processing device.

The processing device can generate the new client-device projection based on the test data. For example, the test data can indicate how many new client-devices arrived on each day of the test period. The processing device can apply a forecasting model (e.g., a Holt-Winters additive model, an exponential smoothing model, or an ARIMA model) to those values in order to project how many new client-devices will likely arrive on each day of the future-time-period.

Figure 14:
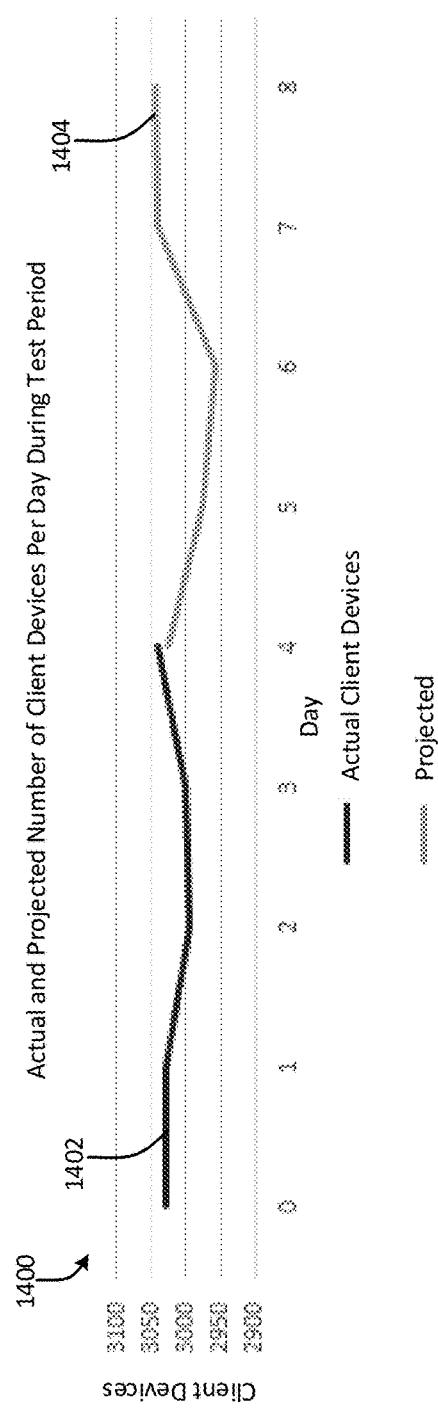
FIG. 14 is a graph of an example of a projection of client devices during a future-time-period according to some aspects.

One example of a new client-device projection is shown in graph 1400 of FIG. 14. As shown, the graph 1400 includes a 9-day timespan along the X-axis. The first five days (days 0-4) correspond to the test period. A line 1402 indicates the number of new client-devices that arrived during each day of the test period. The next five days (days 4-8) correspond to the future-time-period. Another line 1404 indicates the projected number of new client-devices that will likely arrive during each day of the future-time-period. In this example, line 1404 indicates that roughly 3000 new client-devices will likely arrive during each day of the future-time-period.

In block 1208, the processing device generates a new client-device task-completion ("NCDTC") projection. A NCDTC projection indicates the total number of new client-devices that will perform the computing task during the future-time-period, if only the first dataset is provided to the new client-devices during the future-time-period.

The processing device can determine the NCDTC projection based on the new client-device projection and the first set of curves for the first dataset. For example, the processing device can predict the number of new client-devices likely to perform the computing task on the first day of the future-time-period by multiplying (i) the number of new client-devices predicted to arrive on the first day of the future-time-period, as indicated by the client-device projection; by (ii) the probability of task completion on the first day of the future-time-period, as indicated by a curve among the first set of curves corresponding to the first day. As a particular example, referring to FIGS. 13-14 together, the processing device can multiply the probability of 0.06 in graph 1302 by the value of 3025 in graph 1400 to arrive at a projected value of 182 for the first day of the future-time-period. The processing device can repeat this process for each day in the future-time-period and add together the projected values in order to generate the NCDTC projection. One example of the NCDTC projection is 668 client devices.

In block 1210, the processing device generates a known client-device return (KCDR) projection. A known client-device is a client device that already previously received the one of the two datasets during the test period. The KCDR projection indicates how many of the known client-devices that received the second dataset during the test period will return (e.g., communicate with the processing device again) during the future-time-period.

The processing device can generate the KCDR projection based on historical data about each client device's behavior. The historical data can indicate how frequently each client device returns.

In some examples, the processing device can generate the historical data by recording a timestamp every time a client device returns (e.g., during the test period). In one such example, the processing device can be part of a webserver. Each time a client device returns to a website provided by the webserver during the test period, the processing device can record a timestamp and an IP address of the client device. The processing device can repeat this process each client device to form the historical data. In other examples, the processing device can obtain the historical data from a database or server. Either way, the processing device (or another device) can obtain the historical data and apply logistic regression to a known client-device's past behavior (as indicated by the historical data) to determine a probability of that client device returning on each day of the future-time-period. If the client device has a probability of returning any day during the future-time-period that exceeds a predefined threshold, then the processing device can designate the client device as being likely to return again during the future-time-period. The processing device can repeat this process for each of the known client-devices.

One particular example is shown in FIG. 15. In this example, the processing device has analyzed the historical data to generate data table 1500. The data table 1500 indicates the probabilities of each client device returning on (i) the first day of the future-time-period, as shown in column 1502; (ii) the second day of the future-time-period, as shown in column 1504; (iii) the third day of the future-time-period, as shown in column 1506; (iv) the fourth day of the future-time-period, as shown in column 1508, or (v) any combination of these. The processing device can then analyze these probabilities to determine if any of the probabilities for a client device exceeds the predefined threshold of 0.50. Since client devices #1, #2, and #7868 all have at least one probability exceeding 0.50, the processing device can designate these client devices as being likely to return again during the future-time-period. For example, if the processing device is a webserver for providing a website to the client devices, the processing device can designate client devices #1, #2, and #7868 as being likely to return to the website during the future-time-period.

In some examples, the processing device can further group the known client-devices by the day at which they are likely to return during the future-time-period. For example, since client device #1 has a probability that exceeds the predefined threshold on Day 2 in FIG. 15, client device #1 is likely to return on Day 2 of the future-time-period. So client device #1 can be grouped together with other client devices likely to return on Day 2 of the future-time-period. And since client device #2 has a probability that exceeds the predefined threshold on Day 1, client device #2 is likely to return on Day 1 of the future-time-period. So client device #2 can be grouped together with other client devices likely to return on Day 1 of the future-time-period. And since client device #7868 has a probability that exceeds the predefined threshold on Day 3, client device #7686 is likely to return on Day 3 of the future-time-period. So client device #7686 can be grouped together with other client devices likely to return on Day 3 of the future-time-period. The processing device can use these groups to determine how many known client-devices are likely to return on each day of the future-time-period to produce the KCDR projection.

Referring back to FIG. 12, in block 1212, the processing device generates a known client-device task-completion ("KCDTC") projection. The KCDTC projection indicates the total number known client-devices that will likely perform the computing task during the future-time-period, if only the first dataset is transmitted to the known client-devices during the future-time-period. In some examples, this projection is determined in three steps.

Figure 16:
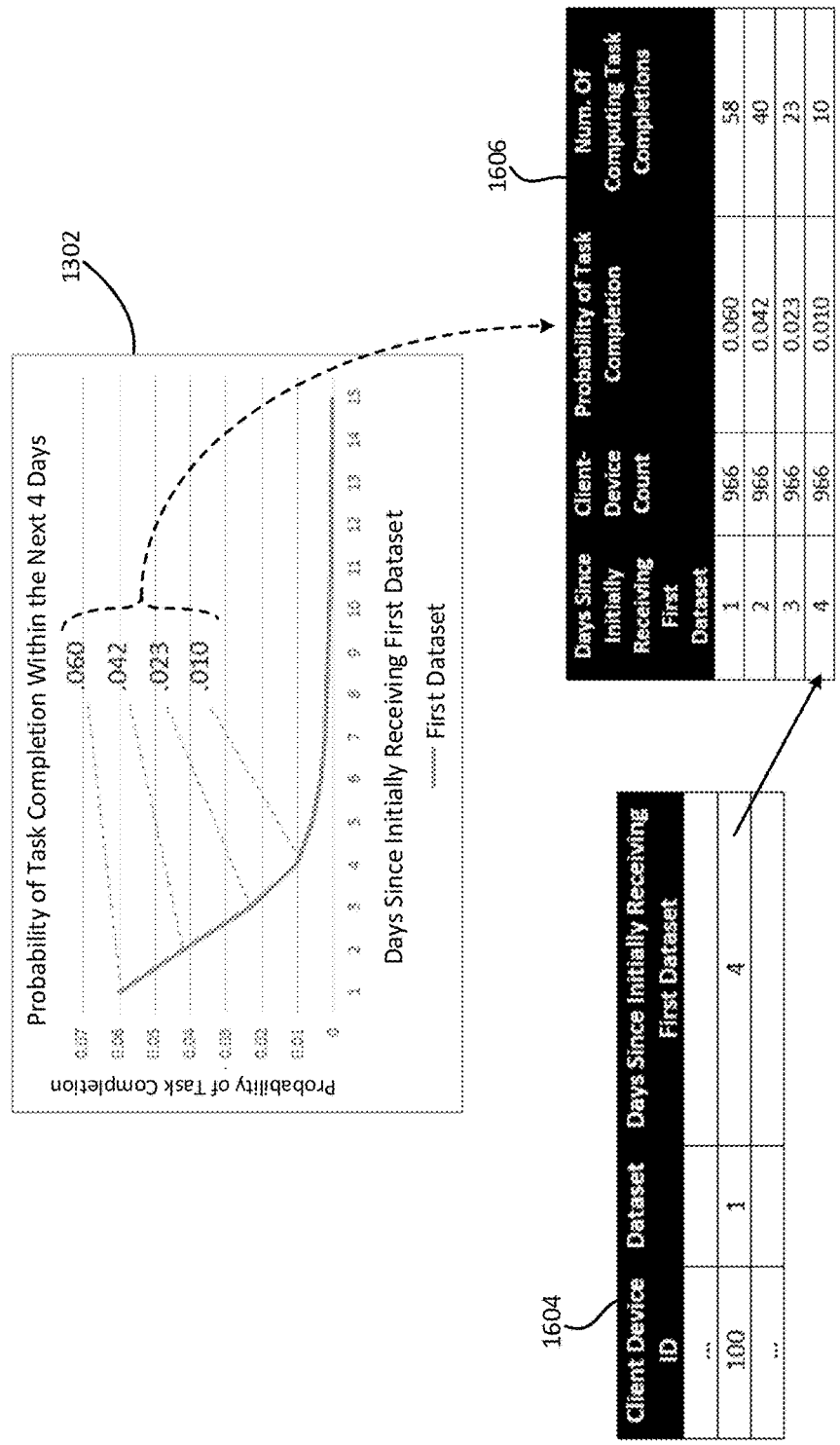
FIG. 16 is an example of a process for determining how many known client-devices that already received a first dataset during a test period are likely to perform a computing task during a future-time-period according to some aspects.

First, the processing device can determine how many of the known client-devices that already received the first dataset during the test period are likely to perform the computing task during the future-time-period. For example, referring to FIG. 16, the processing device can access a table 1604 indicating how long ago (e.g., during the test period) each client device received the first dataset. In this example, client device #100 received the first dataset four days ago. The processing device can then group the client devices together by the day in which they received the first dataset, for example, as shown in table 1606. In this example, a roughly equal number of the client devices (e.g., 966) received the first dataset during each day of the test period. Finally, the processing device can determine an applicable curve among the first set of curves 1300. In this example, the processing device has selected graph 1302 corresponding to the first day of the future-time-period. The processing device can apply the probabilities from the graph 1302 to each group in order to determine how many of the client devices in each group will likely perform the computing task during the future-time-period. The processing device can then add those values together to determine a first count. The first count indicates the total number of known client-devices that already received the first dataset during the test period and that will likely perform the computing task during the future-time-period. One example of the first count is 58+40+23+10=131 client devices.

Second, the processing device can determine how many known client-devices that already received the second dataset during the test period are likely to return again during the future-time-period, receive the first dataset, and consequently perform the computing task. For example, the processing device can use the KCDR projection to determine how many of such client devices will likely return on the first day of the future-time-period. The processing device can then break those client devices up into groups based on when they received the second dataset during the test period. The processing device can then apply the probabilities from a curve associated with the first day of the future-time-period to each group to determine how many of the client devices will likely perform the computing task on the first day of the future-time-period. For example, the processing device can apply the probabilities from graph 1302 of FIG. 13 to the number of client devices in each group to determine a value indicating how many of the client devices will likely return and perform the computing task on the first day of the future-time-period. The processing device can repeat this process for each day of the future-time-period and add the values together to generate a second count.

Figure 17:
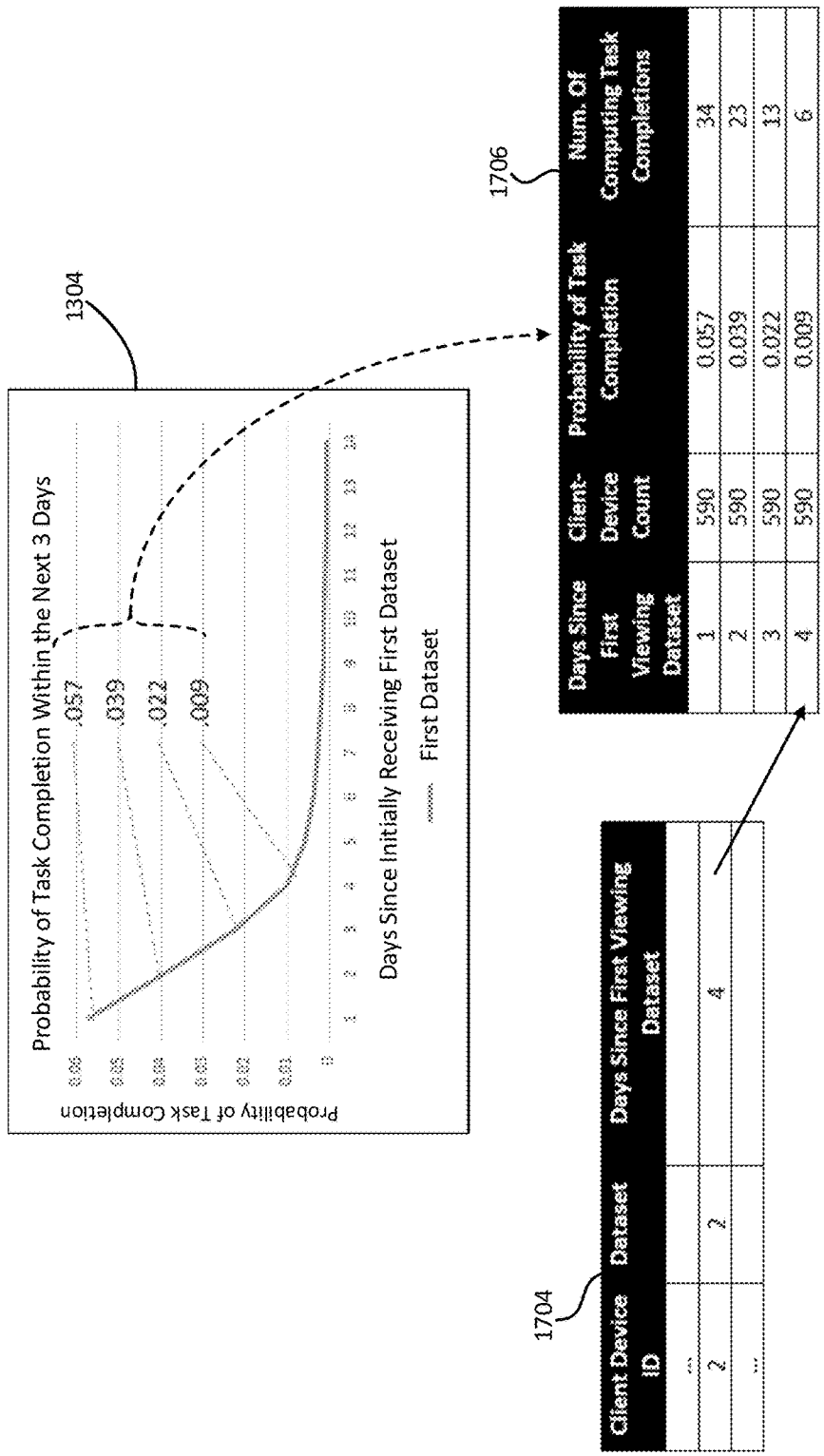
FIG. 17 is an example of a process for determining how many known client-devices that already received a second dataset during a test period are likely to return again during a future-time-period and perform a computing task according to some aspects.

One example is shown in FIG. 17. In this example, the processing device can access a table 1704 indicating on what day in the test period each of the known client-devices originally received the second dataset. For example, table 1704 indicates that client device #2 received the second dataset four days ago. The processing device can then group these known client-devices together based on how many days ago they received the second dataset, for example, as shown in table 1706. In this example, a roughly equal number (e.g., 590) of the client devices received the second dataset during each day of the test period. Finally, the processing device can determine an applicable curve among the first set of curves 1300. In this example, the processing device has selected graph 1304 corresponding to the second day of the future-time-period. The processing device can apply the probabilities from the graph 1304 to the client devices in each group in order to determine how many of the known client-devices will return on the second day of the future-time period, receive the first dataset, and perform the computing task. For example, the processing device can apply the probabilities from graph 1304 to the number of client devices in each group to determine a value of 34+23+13+6=76 client devices. The processing device can repeat this process for each day of the future-time-period and add the values together to generate a second count. The second count can be the total number of known client-devices that already received the second dataset during the test period and that will likely return during the future-time-period, receive the first dataset, and consequently perform the computing task. One example of the second count is 266 client devices.

Third, processing device can add the first count to the second count to determine the total number of known client-devices that will perform the computing task during the future-time-period, if provided with only the first dataset during the future-time-period. This total number can be the KCDTC projection. One example of the KCDTC projection is 131+266=397 client devices.

In block 1214, the processing device determines a first value based on the NCDTC projection (from block 1208) and the KCDTC projection (from block 1212). The first value represents the expected number of times that client devices will likely perform the computing task if all of the client devices are only provided with the first dataset during the future-time-period, regardless of which of the two datasets they were provided with during the test period. In some examples, the processing device can determine the first value by adding together NCDTC projection and the KCDTC projection. In one particular example, the processing device can determine that the first value is 668+397=1065 client devices.

Referring back to FIG. 11, in block 1106, the processing device determines a second value representing how many times the computing task would likely be performed if some of the client devices are provided with the first dataset and others of the client devices are provided with the second dataset during the future-time-period. This may involve performing some or all of the operations shown in FIG. 18. Other examples can involve more operations than, fewer operations than, different operations than, or a different order of the operations shown in FIG. 18.

In block 1802, the processing device assigns the first dataset to a first group of new client-devices and the second dataset to another group of new client-devices. For example, the processing device can assign the first dataset to one half of the new client-devices arriving during the future-time-period and the second dataset to the other half of the new client-devices arriving during the future-time-period.

In block 1804, the processing device generates a first-group computing-task completion ("FGCTC") projection using the first set of curves generated in block 1204. The FGCTC projection indicates how many of the new client-devices in the first group will likely perform the computing task during the future-time-period.

For example, the processing device can predict the number of new client-devices in the first group that are likely to perform the computing task on the first day of the future-time-period by multiplying (i) the number of new client-devices in the first group; by (ii) the probability of task completion on the first day of the future-time-period, as indicated by a curve among the first set of curves corresponding to the first day. As a particular example, if there are 1000 client devices in the first group, the processing device can multiply the probability of 0.06 in graph 1302 by 1000 to determine a projected value of 60. This means that 60 of the new client-devices in the first group will likely perform the computing task on the first day of the future-time-period. The processing device can repeat this process for each day in the future-time-period and add together the projected values in order to generate the FGCTC projection. One example of the FGCTC projection is 223 client devices.

In block 1806, the processing device uses the test data generated in block 1202 to generate a second set of curves for the second dataset. The processing device can implement this operation using a similar process to the one discussed above with respect to block 1204.

In block 1808, the processing device generates a second-group computing-task completion ("SGCTC") projection using the second set of curves. The SGCTC projection indicates how many of the new client-devices in the second group will likely perform the computing task during the future-time-period. The processing device can implement this operation using a similar process to the one discussed above with respect to block 1804. One example of the SGCTC projection is 147 client devices.

In block 1810, the processing device determines a first count of how many known client-devices that already received the first dataset during the test period are likely to perform the computing task during the future-time-period.

This can be the same as the first count determined in block 1212 above, e.g., 131 client devices.

In block 1812, the processing device determines a second count of how many known client-devices that already received the second dataset during the test period are likely to perform the computing task during the future-time-period. This can be the same as the second count determined in block 1212 above, e.g., 76 client devices.

In block 1814, the processing device determines a second value based on the FGCTC projection, the SGCTC projection, the first count, the second count, or any combination of these. The second value represents the expected number of times that client devices will likely perform the computing task if some client devices are provided with the first dataset during the future-time-period and others of the client devices are provided the second dataset during the future-time-period. In some examples, the processing device can add together all of these numbers to arrive at the second value. For instance, the processing device can determine that the second value is 223+147+131+76=577 client devices.

Referring now back to FIG. 11, in block 1108, the processing device determines an impact value. The impact value represents how providing client devices with only the first dataset during the future-time-period influences performance of the computing task, as opposed to providing some client devices with the first dataset and other client devices with the second dataset during the future-time-period. The processing device can determine the impact value by subtracting the second value from the first value. For example, the processing device can determine that the impact value is 1065−577=488 more client devices are likely to perform the computing task if the client devices are only provided the first dataset during the future-time-period. This indicates that the first dataset is more likely to elicit performance of the computing task than the second dataset.

In block 1110, the processing device allocates computing resources. This can involve the processing device allocating its own computing resources or communicating with another server to cause the other server to allocate its computing resources. The processing device can allocate computing resources based on the first value, the second value, the impact value, or any combination of these.

In some examples, the processing device allocates the computing resources based on the first value (from block 1214). For example, the processing device can automatically and preemptively cause computing resources to be allocated such that sufficient resources are available to handle transmitting the first dataset as many times as indicated by the first value. This can reduce latency, memory errors, and processing errors, and provide other improvements to system operation.

In some examples, the processing device allocates the computing resources based on the impact value (from block 1108). For example, if the impact value is positive, it may suggest that the most efficient way in which to allocate computing resources in order elicit performance of the computing task is to only transmit the first dataset during the future-time-period. So the processing device cause only the first dataset to be provided during the future-time-period. In contrast, if the impact value is negative, it may suggest that the most efficient way in which to allocate computing resources in order to elicit performance of the computing task is to provide both the first dataset and the second dataset during the future-time-period. So the processing device can cause both datasets to be provided during the future-time-period. Either way, the processing device can cause the optimal approach to be implemented, whereby the optimal approach elicits performance of the computing task the most times (e.g., while consuming the least amount of computing resources).

While the above processes are described in relation to two datasets (e.g., the first dataset and the second dataset) for simplicity, a similar process can be performed for three or more datasets. For example, a processing device can select three datasets to be provided to client devices. During the test period, the three datasets may be provided to the client devices in a specific distribution, for example, such that a first dataset is provided to 70% of the client devices, a second dataset is provided to 15% of the client devices, and a third dataset is provided to 15% of the client devices. The above processes can then be performed to determine the potential impact of transmitting all 100% of the client devices just one of those datasets (e.g., the third dataset) during the future-time-period.

Also, while the above processes are discussed in relation to allocating computing resources, other applications are possible. Another exemplary application of the above processes can be for split testing (e.g., A/B testing), whereby the first dataset and the second dataset are different creatives (e.g., advertisements) capable of being transmitted to the client devices in order to elicit a particular response from users of the client devices, such as to influence the users to click on the creatives (e.g., to influence the users to convert). In some such examples, the processing device can perform the above processes to determine an impact value representing the potential impact of only transmitting one of the two creatives to the users during a future-time-period, as opposed to transmitting both of the creatives to the users during the future-time-period.

More specifically, in some examples the processing device can apply the process shown in FIG. 12 to users (instead of to client devices), in order to:

- generate test data indicating how many users completed a task (e.g., clicked an ad, bought a product, etc.) during the test period;
- use the test data to generate a first set of curves for a first dataset;
- generate a new user (NU) projection based on the test data, where the NU projection indicates how many new users will communicate with the processing device during the future-time-period, whereby a new user is a user that did not previously receive one of the two datasets from the processing device;
- generate a new user task-completion (NUTC) projection based on the NU projection, where the NUTC projection indicates a total number of new users that will perform the task during the future time period, if only the first dataset is provided to the new users during the future-time-period;
- generate a known user (KU) projection using the test data indicating how many of known users that received the second dataset during the test period will return during the future-time-period, whereby a known user is a user that already previously received the one of the two datasets during the test period;
- generate a known user task-completion (KUTC) projection based on the KU projection, where the KUTC projection indicates the total number known users that will likely perform the task during the future-time-period, if only the first dataset is transmitted to the known users during the future-time-period; and
- determine a first value based at least in part on the NUTC projection and the KUTC projection, where the first value can represent the expected number of times that users will likely perform the task if all of the users are only provided with the first dataset during the future-time-period, regardless of which of the two datasets they were provided during the test period.

Figure 18:
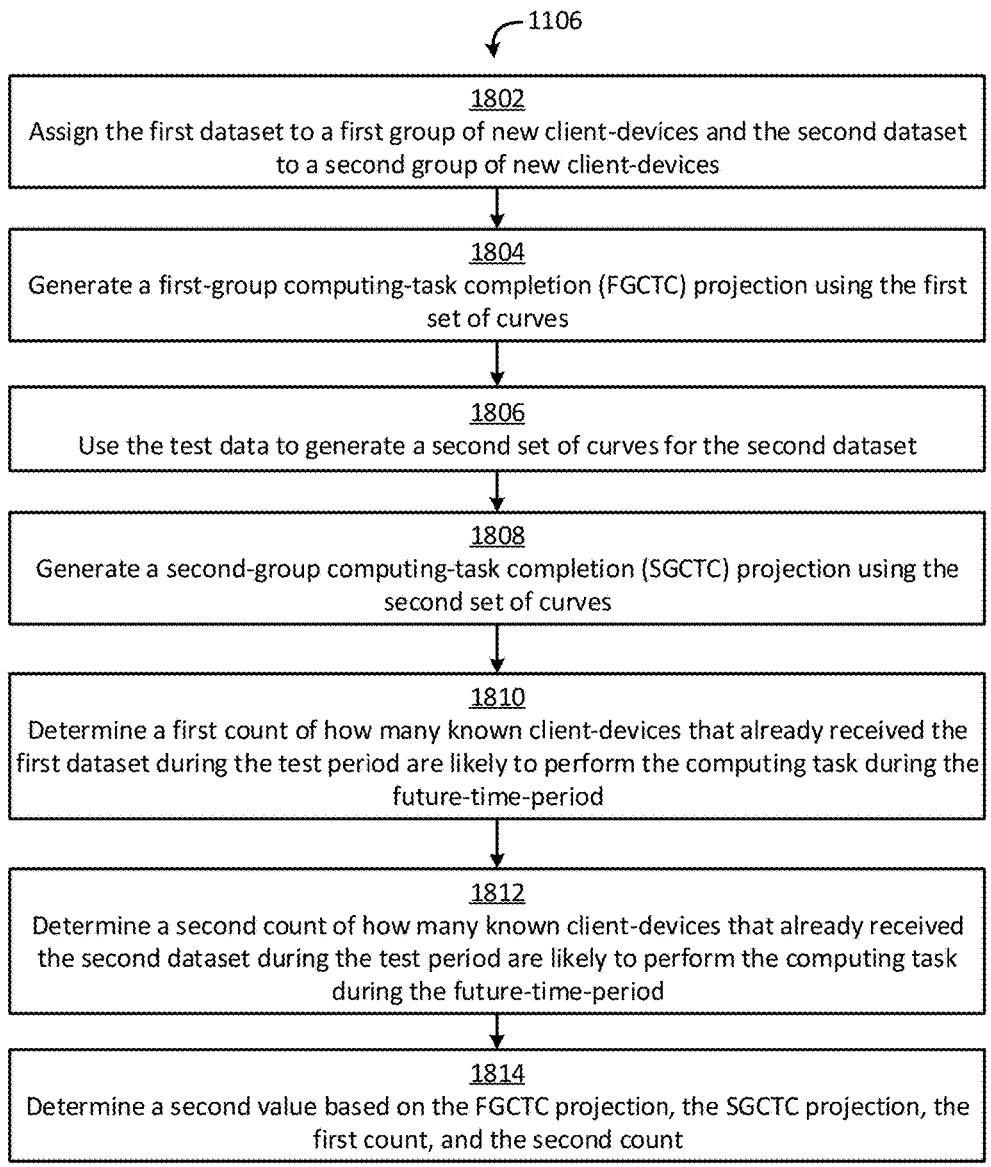
FIG. 18 is a flow chart of an example of a process for determining a second value according to some aspects.

The processing device can also apply the process shown in FIG. 18, in order to:
- assign the first dataset to a first group of users and a second dataset to a second group of new users;
- generate a first-group task completion (FGTC) projection using the first set of curves, where the FGTC projection indicates how many of the new users in the first group will likely perform the task during the future-time-period;
- use the test data to generate a second set of curves for the second dataset;
- generate a second-group task completion (SGTC) projection using the second set of curves, wherein the SGTC projection indicates how many of the new users in the second group will likely perform the task during the future-time-period;
- determine a first count of how many known users that already received the first dataset during the first time period are likely to perform the task during the future-time-period;
- determine a second count of how many known users that already received the second dataset during the first time period are likely to perform the task during the future-time-period; and
- determine a second value based on the FGTC projection, the SGTC projection, the first count, and the second count, where the second value represents the expected number of times that users will likely perform the task if some users are provided with the first dataset during the future-time-period and other users are provided the second dataset during the future-time-period.

The processing device can then subtract the second value from the first value to determine an impact value. The processing device may or may not allocate computing resources based on the first value, the second value, or the impact value.

The above principles can also be extended to three or more datasets, such that the processing device can determine an impact value representing the potential impact of transmitting only one of the datasets to the users during the future-time-period, as opposed to transmitting the three or more datasets to the users during the future-time-period.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A non-transitory computer-readable medium comprising program code that is executable by a processing device for causing the processing device to:
   determine a plurality of datasets configured to be transmitted to client devices to elicit performance of a computing-task via the client devices, wherein the plurality of datasets includes a first dataset and a second dataset;
   generate test data indicating how many times the computing-task was performed during a test period, wherein the test data is generated by transmitting both the first dataset and the second dataset to a group of client devices during the test period and logging how many of the client devices in the group perform the computing-task;
   generate a plurality of sets of data-curves for each dataset among the plurality of datasets using the test data, each set of data-curves spanning a future-time-period that is subsequent to the test period and indicating respective likelihoods of a particular dataset resulting in performance of the computing-task during various timespans within the future-time-period;
   generate a new client-device (NCD) projection based on the test data, wherein the NCD projection indicates how many new client-devices will communicate with the processing device during the future-time-period;
   generate a new client-device task-completion (NCDTC) projection using (i) the NCD projection, and (ii) a particular set of data-curves for the first dataset among the plurality of sets of data-curves for the plurality of datasets, wherein the NCDTC projection indicates a total number of new client-devices that will perform the computing-task during the future-time-period, if only the first dataset is provided to the new client-devices during the future-time-period;
   determine a first value based at least in part on the NCDTC projection, the first value representing how many times the computing-task would likely be performed if the client devices are only provided with the first dataset during the future-time-period;

determine a second value representing how many times the computing-task would be completed if some of the client devices are provided with the first dataset and others of the client devices are provided with the second dataset during the future-time-period;

determine an impact value by subtracting the second value from the first value, the impact value representing how providing the client devices with only the first dataset during the future-time-period influences performance of the computing-task, as compared to providing the client devices with both the first dataset and the second dataset during the future-time-period; and allocate computing resources based on the first value, the second value, or the impact value.

2. The non-transitory computer-readable medium of claim 1, further comprising program code that is executable by the processing device for causing the processing device to:

generate a first count using the test data and the plurality of sets of data-curves, the first count indicating a total number of known client-devices that already received the first dataset during the test period and that will likely perform the computing-task during the future-time-period;

determine a known client-device task-completion project (KCDTC) projection based at least in part on the first count; and determine the first value based on the NCDTC projection and the KCDTC projection.

3. The non-transitory computer-readable medium of claim 2, further comprising program code that is executable by the processing device for causing the processing device to:

generate a known client-device return (KCDR) projection based on historical data about the known client-devices from the test period, the historical data indicating a frequency at which the known client-devices communicated with the processing device during the test period;

determine a second count using the KCDR projection and the plurality of sets of data-curves, the second count indicating a total number of known client-devices that already received the second dataset during the test period and that will likely return during the future-time-period, receive the first dataset, and consequently perform the computing-task; and determine the KCDTC projection by adding the first count to the second count.

4. The non-transitory computer-readable medium of claim 3, further comprising program code that is executable by the processing device for causing the processing device to:

assign the first dataset to a first group of new client-devices and the second dataset to a second group of new client-devices;

generate a first-group computing-task completion (FGCTC) projection using the particular set of data-curves for the first dataset, the FGCTC projection indicating how many of the new client-devices in the first group will likely perform the computing-task during the future-time-period;

generate a second-group computing-task completion (SGCTC) projection using another set of data-curves for the second dataset among the plurality of sets of data-curves, the SGCTC projection indicating how many of the new client-devices in the second group will likely perform the computing-task during the future-time-period; and determine the second value based at least in part on the FGCTC projection and the SGCTC projection.

5. The non-transitory computer-readable medium of claim 4, further comprising program code that is executable by the processing device for causing the processing device to determine the second value by adding together the FGCTC projection, the SGCTC projection, the first count, the second count.

6. The non-transitory computer-readable medium of claim 1, further comprising program code that is executable by the processing device for causing the processing device to allocate the computing resources by transmitting data to a server, the data being configured to cause the computing resources to be allocated on the server.

7. The non-transitory computer-readable medium of claim 1, further comprising program code that is executable by the processing device for causing the processing device to allocate the computing resources by causing an amount of the computing resources to be dedicated to providing the first dataset or the second dataset during the future-time-period.

8. The non-transitory computer-readable medium of claim 7, wherein the amount of the computing resources is proportionally related to the impact value, the first value, or the second value.

9. The non-transitory computer-readable medium of claim 1, wherein the computing resources include a network resource, a data-storage resource, a processing resource, or a memory resource.

10. The non-transitory computer-readable medium of claim 1, wherein the computing resources are allocated based on the impact value.

11. A system comprising:
a processing device; and
a memory device comprising program code that is executable by the processing device for causing the processing device to:
determine a plurality of datasets configured to be transmitted to client devices to elicit performance of a computing-task via the client devices, wherein the plurality of datasets includes a first dataset and a second dataset;

generate test data indicating how many times the computing-task was performed during a test period, wherein the test data is generated by transmitting both the first dataset and the second dataset to a group of client devices during the test period and logging how many of the client devices in the group perform the computing-task;

generate a plurality of sets of data-curves for each dataset among the plurality of dataset using the test data, each set of data-curves spanning a future-time-period that is subsequent to the test period and indicating respective likelihoods of a particular dataset resulting in performance of the computing-task during various timespans within the future-time-period;

generate a new client-device (NCD) projection based on the test data, wherein the NCD projection indicates how many new client-devices will communicate with the processing device during the future-time-period;

generate a new client-device task-completion (NCDTC) projection using (i) the NCD projection, and (ii) a particular set of data-curves for the first dataset among the plurality of sets of data-curves for the plurality of datasets, wherein the NCDTC projection indicates a total number of new client-devices that will perform the computing-task during the future-time-period, if only the first dataset is provided to the new client-devices during the future-time-period;

determine a first value based at least in part on the NCDTC projection, the first value representing how many times the computing-task would likely be performed if the client devices are only provided with the first dataset during the future-time-period;

determine a second value representing how many times the computing-task would be completed if some of the client devices are provided with the first dataset and others of the client devices are provided with the second dataset during the future-time-period;

determine an impact value by subtracting the second value from the first value, the impact value representing how providing the client devices with only the first dataset during the future-time-period influences performance of the computing-task, as compared to providing the client devices with both the first dataset and the second dataset during the future-time-period; and allocate computing resources based on the first value, the second value, or the impact value.

12. The system of claim 11, wherein the memory device further comprises program code that is executable by the processing device for causing the processing device to:

generate a first count using the test data and the plurality of sets of data-curves, the first count indicating a total number of known client-devices that already received the first dataset during the test period and that will likely perform the computing-task during the future-time-period;

determine a known client-device task-completion project (KCDTC) projection based at least in part on the first count; and determine the first value based on the NCDTC projection and the KCDTC projection.

13. The system of claim 12, wherein the memory device further comprises program code that is executable by the processing device for causing the processing device to:

generate a known client-device return (KCDR) projection based on historical data about the known client-devices from the test period, the historical data indicating a frequency at which the known client-devices communicated with the processing device during the test period;

determine a second count using the KCDR projection and the plurality of sets of data-curves, the second count indicating a total number of known client-devices that already received the second dataset during the test period and that will likely return during the future-time-period, receive the first dataset, and consequently perform the computing-task; and determine the KCDTC projection by adding the first count to the second count.

14. The system of claim 13, wherein the memory device further comprises program code that is executable by the processing device for causing the processing device to:

assign the first dataset to a first group of new client-devices and the second dataset to a second group of new client-devices;

generate a first-group computing-task completion (FGCTC) projection using the particular set of data-curves for the first dataset, the FGCTC projection indicating how many of the new client-devices in the first group will likely perform the computing-task during the future-time-period;

generate a second-group computing-task completion (SGCTC) projection using another set of data-curves for the second dataset among the plurality of sets of data-curves, the SGCTC projection indicating how many of the new client-devices in the second group will likely perform the computing-task during the future-time-period; and determine the second value based at least in part on the FGCTC projection and the SGCTC projection.

15. The system of claim 14, wherein the memory device further comprises program code that is executable by the processing device for causing the processing device to determine the second value by adding together the FGCTC projection, the SGCTC projection, the first count, the second count.

16. The system of claim 11, wherein the memory device further comprises program code that is executable by the processing device for causing the processing device to allocate the computing resources by transmitting data to a server, the data being configured to cause the computing resources to be allocated on the server.

17. The system of claim 11, wherein the memory device further comprises program code that is executable by the processing device for causing the processing device to allocate the computing resources by causing an amount of the computing resources to be dedicated to providing the first dataset or the second dataset during the future-time-period.

18. The system of claim 17, wherein the amount of the computing resources is proportionally related to the impact value, the first value, or the second value.

19. The system of claim 11, wherein the computing resources include a network resource, a data-storage resource, a processing resource, or a memory resource.

20. The system of claim 11, wherein the computing resources are allocated based on the impact value.

21. A method comprising:

determining, by a processing device, a plurality of datasets configured to be transmitted to client devices to elicit performance of a computing-task via the client devices, wherein the plurality of datasets includes a first dataset and a second dataset;

generating, by the processing device, test data indicating how many times the computing-task was performed during a test period, wherein the test data is generated by transmitting both the first dataset and the second dataset to a group of client devices during the test period and logging how many of the client devices in the group perform the computing-task;

generating, by the processing device, a plurality of sets of data-curves for each dataset among the plurality of datasets using the test data, each set of data-curves spanning a future-time-period that is subsequent to the test period and indicating respective likelihoods of a particular dataset resulting in performance of the computing-task during various timespans within the future-time-period;

generating, by the processing device, a new client-device (NCD) projection based on the test data, wherein the NCD projection indicates how many new client-devices will communicate with the processing device during the future-time-period;

generating, by the processing device, a new client-device task-completion (NCDTC) projection using (i) the NCD projection, and (ii) a particular set of data-curves for the first dataset among the plurality of sets of data-curves for the plurality of datasets, wherein the NCDTC projection indicates a total number of new client-devices that will perform the computing-task during the future-time-period, if only the first dataset is provided to the new client-devices during the future-time-period;

determining, by the processing device, a first value based at least in part on the NCDTC projection, the first value representing how many times the computing-task would likely be performed if the client devices are only provided with the first dataset during the future-time-period;

determining, by the processing device, a second value representing how many times the computing-task would be completed if some of the client devices are provided with the first dataset and others of the client devices are provided with the second dataset during the future-time-period;

determining, by the processing device, an impact value by subtracting the second value from the first value, the impact value representing how providing the client devices with only the first dataset during the future-time-period influences performance of the computing-task, as compared to providing the client devices with both the first dataset and the second dataset during the future-time-period; and allocating, by the processing device, computing resources based on the first value, the second value, or the impact value.

22. The method of claim 21, further comprising:

generating a first count using the test data and the plurality of sets of data-curves, the first count indicating a total number of known client-devices that already received the first dataset during the test period and that will likely perform the computing-task during the future-time-period;

determining a known client-device task-completion project (KCDTC) projection based at least in part on the first count; and determining the first value based on the NCDTC projection and the KCDTC projection.

23. The method of claim 22, further comprising:

generating a known client-device return (KCDR) projection based on historical data about the known client-devices from the test period, the historical data indicating a frequency at which the known client-devices communicated with the processing device during the test period;

determining a second count using the KCDR projection and the plurality of sets of data-curves, the second count indicating a total number of known client-devices that already received the second dataset during the test period and that will likely return during the future-time-period, receive the first dataset, and consequently perform the computing-task; and determining the KCDTC projection by adding the first count to the second count.

24. The method of claim 23, further comprising:

assigning the first dataset to a first group of new client-devices and the second dataset to a second group of new client-devices;

generating a first-group computing-task completion (FGCTC) projection using the particular set of data-curves for the first dataset, the FGCTC projection indicating how many of the new client-devices in the first group will likely perform the computing-task during the future-time-period;

generating a second-group computing-task completion (SGCTC) projection using another set of data-curves for the second dataset among the plurality of sets of data-curves, the SGCTC projection indicating how many of the new client-devices in the second group will likely perform the computing-task during the future-time-period; and determining the second value based at least in part on the FGCTC projection and the SGCTC projection.

25. The method of claim 24, further comprising determining the second value by adding together the FGCTC projection, the SGCTC projection, the first count, the second count.

26. The method of claim 21, further comprising allocating the computing resources by transmitting data to a server, the data being configured to cause the computing resources to be allocated on the server.

27. The method of claim 21, further comprising allocating the computing resources by causing an amount of the computing resources to be dedicated to providing the first dataset or the second dataset during the future-time-period.

28. The method of claim 27, wherein the amount of the computing resources is proportionally related to the impact value, the first value, or the second value.

29. The method of claim 21, wherein the computing resources include a network resource, a data-storage resource, a processing resource, or a memory resource.

30. A non-transitory computer-readable medium comprising program code that is executable by a processing device for causing the processing device to:

determine a plurality of datasets configured to be transmitted to users to elicit performance of a task, wherein the plurality of datasets includes a first dataset and a second dataset;

generate test data indicating how many times the task was performed during a test period, wherein the test data is generated by transmitting both the first dataset and the second dataset to a group of users during the test period and logging how many of the users in the group perform the task;

generate a plurality of sets of data-curves for each dataset among the plurality of datasets using the test data, each set of data-curves spanning a future-time-period that is subsequent to the test period and indicating respective likelihoods of a particular dataset resulting in performance of the task during various timespans within the future-time-period;

generate a new user (NU) projection based on the test data, wherein the NU projection indicates how many new users will communicate with the processing device during the future-time-period;

generate a new user task-completion (NUTC) projection using (i) the NU projection, and (ii) a particular set of data-curves for the first dataset among the plurality of sets of data-curves for the plurality of datasets, wherein the NUTC projection indicates a total number of new users that will perform the task during the future-time-period, if only the first dataset is provided to the new users during the future-time-period;

determine a first value based at least in part on the NUTC projection, the first value representing how many times the task would likely be performed if the users are only provided with the first dataset during the future-time-period;

determine a second value representing how many times the task would be completed-if some of the users are provided with the first dataset and others of the users are provided with the second dataset during the future-time-period;

determine an impact value by subtracting the second value from the first value, the impact value representing how providing the users with only the first dataset during the future-time-period influences performance of the task, as compared to providing the users with both the first dataset and the second dataset during the future-time-period; and cause a server to selectively transmit at least one of the first dataset or the second dataset to the users during the future-time-period, based on the impact value.

* * * * *